United States Patent [19]
Simpson et al.

[11] Patent Number: 5,630,160
[45] Date of Patent: May 13, 1997

[54] FLOATING POINT EXPONENT COMPARE USING REPEATED TWO BIT COMPARE CELL

[75] Inventors: Richard Simpson, Carlton, Great Britain; Erick Oakland, Zavalla, Tex.

[73] Assignee: Texas Instruments Incorporated, Dallas, Tex.

[21] Appl. No.: 400,709

[22] Filed: Mar. 8, 1995

[51] Int. Cl.$^6$ .................................................. G06F 7/00
[52] U.S. Cl. ..................... 395/800; 364/748; 364/232.8; 364/258; 364/259.8; 364/DIG. 1; 340/146.2
[58] Field of Search ..................................... 395/800, 885, 395/183.13, 100, 162; 382/30, 34, 48; 364/736, 741, 748, 419.13; 340/146.2; 327/3, 40, 63, 90; 371/24, 67.1, 71

[56] References Cited

U.S. PATENT DOCUMENTS

| | | | |
|---|---|---|---|
| 4,316,105 | 2/1982 | Fowler | 327/85 |
| 5,272,657 | 12/1993 | Basehore et al. | 382/157 |
| 5,281,946 | 1/1994 | Van Le | 340/146.2 |
| 5,400,007 | 3/1995 | McClure | 340/146.2 |
| 5,493,653 | 2/1996 | Schmidt et al. | 327/110 |
| 5,497,340 | 3/1996 | Uramoto et al. | 364/745 |
| 5,534,844 | 7/1996 | Norris | 340/146.2 |
| 5,557,708 | 9/1996 | Herbert | 395/108 |

*Primary Examiner*—Alpesh M. Shah
*Attorney, Agent, or Firm*—Robert D. Marshall, Jr.; James C. Kesterson; Richard L. Donaldson

[57] ABSTRACT

A magnitude comparator employs plural layers of repeated circuits which are scalable to any size. The magnitude comparator indicates whether two multibit inputs are equal, and if not equal indicates if a first multibit input is greater than a second multibit input. A single bit comparator circuit receives a corresponding bit of the two multibit inputs. Each single bit comparator generates an A=B output equal to the exclusive NOR of the two inputs and an A>B output equal to the first input. The magnitude comparator includes at least one two bit comparator circuit disposed in at least one layer. Each two bit comparator circuit includes an A[0]=B[0] input, an A[0]>B[0] input, an A[1]=B[1] input and an A[1]>B[1] input. Each two bit comparator circuit generates an A=B output of an AND of signals received at the A[0]=B[0] and A[1]=B[1] inputs. Each two bit comparator circuit generates an A>B output equal to the A[1]>B[1] input if the A[0]=B[0] input is "1" and equal to the A[0]>B[0] input if the A[0]=B[0] input is "0".

8 Claims, 16 Drawing Sheets

32-BIT REGISTERS

64-BIT REGISTER PAIRS
(ALWAYS ADDRESSED USING
AN EVEN REGISTER NUMBER)

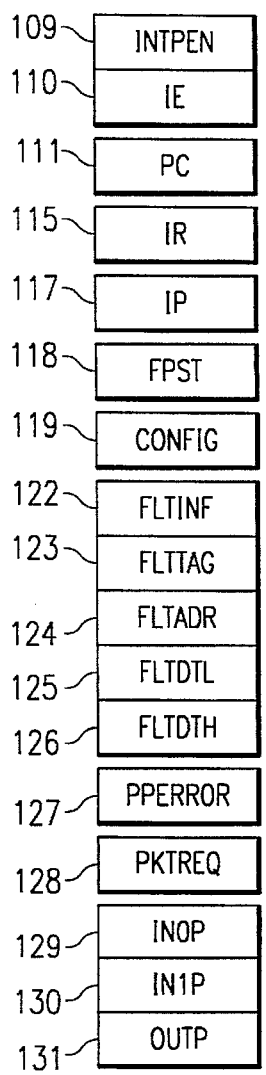
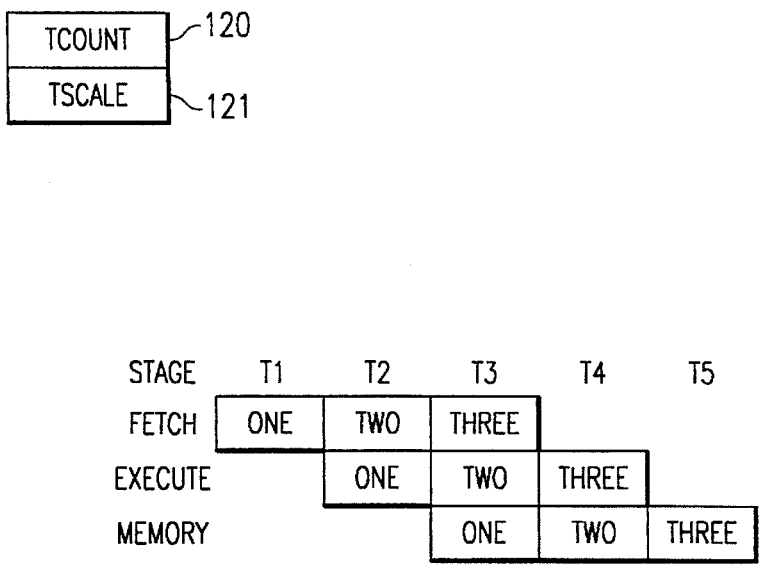
FIG. 7
FIG. 8
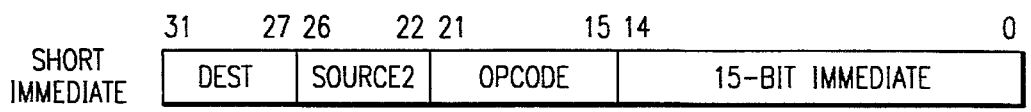
FIG. 9a
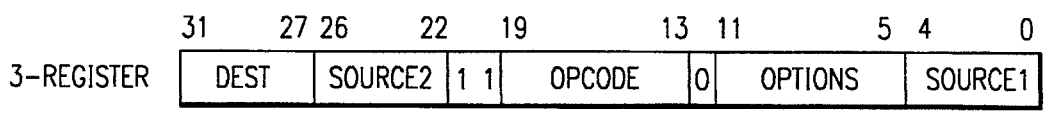
FIG. 9b
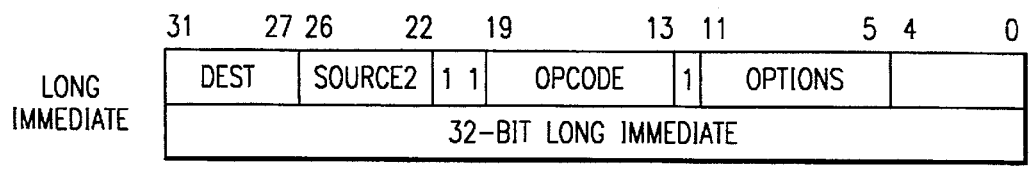
FIG. 9c

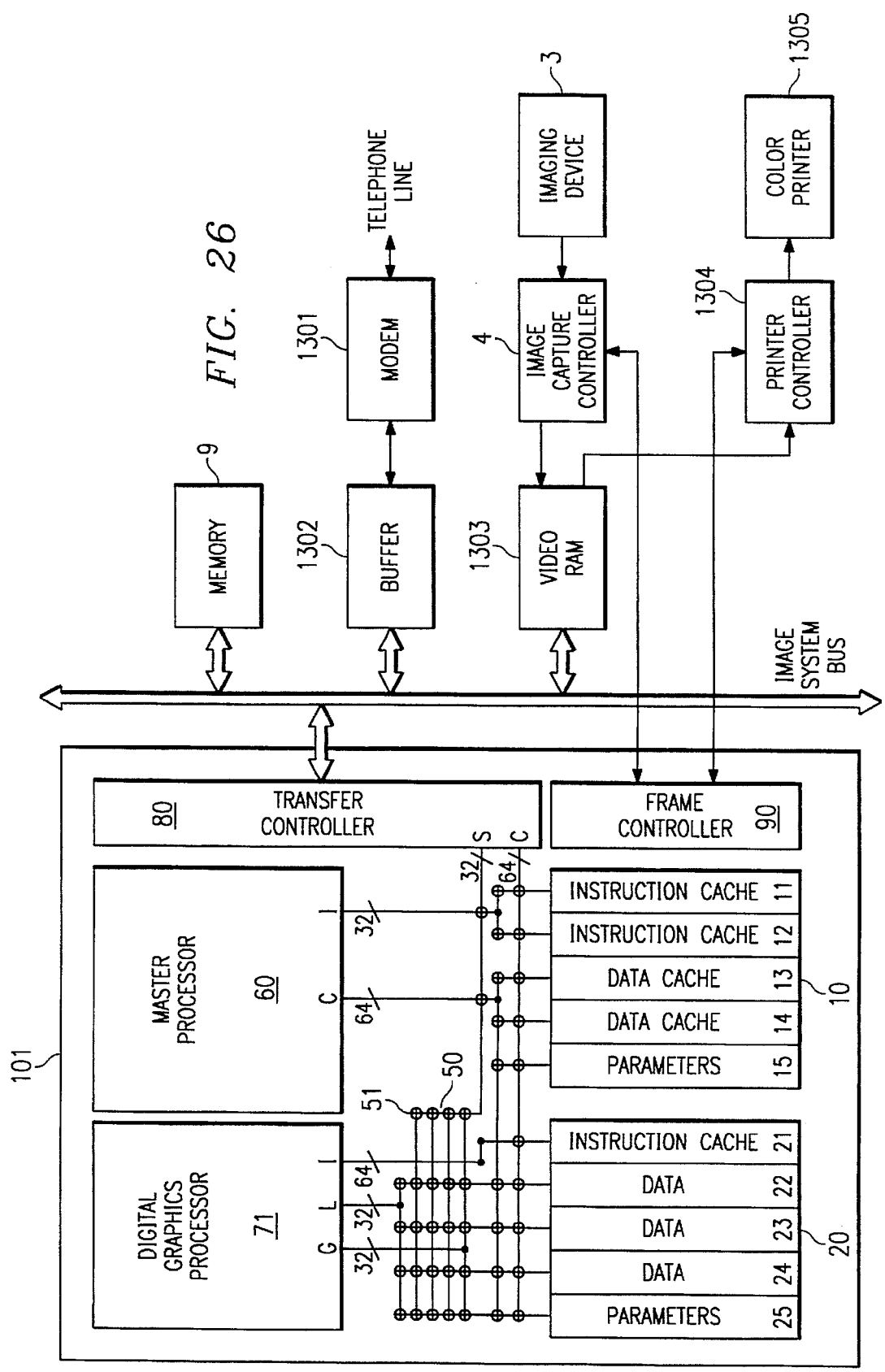

FLOATING POINT EXPONENT COMPARE USING REPEATED TWO BIT COMPARE CELL

CROSS REFERENCE TO RELATED APPLICATIONS

This application relates to improvements in the inventions disclosed in the following patents and copending U.S. patent applications, all of which are assigned to Texas Instruments and all of which are incorporated by reference:

U.S. patent application Ser. No. 08/135,754 Oct. 12, 1993 entitled "MULTI-PROCESSOR WITH CROSSBAR LINK OF PROCESSORS AND MEMORIES AND METHOD OF OPERATION", a continuation of U.S. patent application Ser. No. 07/933,865 filed Aug. 21, 1992 and now abandoned, which is a continuation of U.S. patent application Ser. No. 07/435,591 filed Nov. 17, 1989 and now abandoned;

U.S. Pat. No. 5,212,777, issued May 18, 1993, filed Nov. 17, 1989 and entitled "SIMD/MIMD RECONFIGURABLE MULTI-PROCESSOR AND METHOD OF OPERATION";

U.S. patent application Ser. No. 07/895,565 filed Jun. 5, 1992 entitled "RECONFIGURABLE COMMUNICATIONS FOR MULTI-PROCESSOR AND METHOD OF OPERATION," a continuation of U.S. patent application Ser. No. 437,856 filed Nov. 17, 1989 and now abandoned;

U.S. patent application Ser. No. 07/437,852 filed Nov. 17, 1989 entitled "REDUCED AREA OF CROSSBAR AND METHOD OF OPERATION";

U.S. patent application Ser. No. 08/032,530 filed Mar. 15, 1993 entitled "SYNCHRONIZED MIMD MULTI-PROCESSING SYSTEM AND METHOD OF OPERATION," a continuation of U.S. patent application Ser. No. 07/437,853 filed Nov. 17, 1989 and now abandoned;

U.S. Pat. No. 5,197,140 issued Mar. 23, 1993 filed Nov. 17, 1989 and entitled "SLICED ADDRESSING MULTI-PROCESSOR AND METHOD OF OPERATION";

U.S. patent application Ser. No. 437,857 filed Nov. 17, 1989 entitled "ARITHMETIC LOGIC UNIT ONES COUNTING LOGIC";

U.S. Pat. No. 5,239,654 issued Aug. 24, 1993 filed Nov. 17, 1989 and entitled "DUAL MODE SIMD/MIMD PROCESSOR PROVIDING REUSE OF MIMD INSTRUCTION MEMORIES AS DATA MEMORIES WHEN OPERATING IN SIMD MODE";

U.S. patent application Ser. No. 911,562 filed Jun. 29, 1992 entitled "IMAGING COMPUTER AND METHOD OF OPERATION", a continuation of U.S. patent application Ser. No. 437,854 filed Nov. 17, 1989 and now abandoned; and U.S. Pat. No. 5,226,125 issued Jul. 6, 1993 filed Nov. 17, 1989 and entitled "SWITCH MATRIX HAVING INTEGRATED CROSSPOINT LOGIC AND METHOD OF OPERATION".

U.S. patent application Ser. No. 08/160,299 filed Nov. 30, 1993 and entitled "THREE INPUT ARITHMETIC LOGIC UNIT WITH BARREL ROTATOR";

U.S. patent application Ser. No. 08/158,742 filed Nov. 30, 1993 and entitled "ARITHMETIC LOGIC UNIT HAVING PLURAL INDEPENDENT SECTIONS AND REGISTER STORING RESULTANT INDICATOR BIT FROM EVERY SECTION";

U.S. patent application Ser. No. 08/160,118 filed Nov. 30, 1993 "MEMORY STORE FROM A REGISTER PAIR CONDITIONAL";

U.S. patent application Ser. No. 08/160,115 filed Nov. 30, 1993 and entitled "ITERATIVE DIVISION APPARATUS, SYSTEM AND METHOD FORMING PLURAL QUOTIENT BITS PER ITERATION";

U.S. patent application Ser. No. 08/159,285 filed Nov. 30, 1993 and entitled "THREE INPUT ARITHMETIC LOGIC UNIT FORMING MIXED ARITHMETIC AND BOOLEAN COMBINATIONS";

U.S. patent application Ser. No. 08/160,119 filed Nov. 30, 1993 and entitled "METHOD, APPARATUS AND SYSTEM FORMING THE SUM OF DATA IN PLURAL EQUAL SECTIONS OF A SINGLE DATA WORD";

U.S. patent application Ser. No. 08/159,359 filed Nov. 30, 1993 and entitled "HUFFMAN ENCODING METHOD, CIRCUITS AND SYSTEM EMPLOYING MOST SIGNIFICANT BIT CHANGE FOR SIZE DETECTION";

U.S. patent application Ser. No. 08/160,296 filed Nov. 30, 1993 and entitled "HUFFMAN DECODING METHOD, CIRCUIT AND SYSTEM EMPLOYING CONDITIONAL SUBTRACTION FOR CONVERSION OF NEGATIVE NUMBERS";

U.S. patent application Ser. No. 08/160,112 filed Nov. 30, 1993 and entitled "METHOD, APPARATUS AND SYSTEM FOR SUM OF PLURAL ABSOLUTE DIFFERENCES";

U.S. patent application Ser. No. 08/160,120 filed Nov. 30, 1993 and entitled "ITERATIVE DIVISION APPARATUS, SYSTEM AND METHOD EMPLOYING LEFT MOST ONE'S DETECTION AND LEFT MOST ONE'S DETECTION WITH EXCLUSIVE OR";

U.S. patent application Ser. No. 08/160,114 filed Nov. 30, 1993 and entitled "ADDRESS GENERATOR EMPLOYING SELECTIVE MERGE OF TWO INDEPENDENT ADDRESSES";

U.S. patent application Ser. No. 08/160,116 filed Nov. 30, 1993 and entitled "METHOD, APPARATUS AND SYSTEM METHOD FOR CORRELATION";

U.S. patent application Ser. No. 08/160,297 filed Nov. 30, 1993 and entitled "LONG INSTRUCTION WORD CONTROLLING PLURAL INDEPENDENT PROCESSOR OPERATIONS";

U.S. patent application Ser. No. 08/159,346 filed Nov. 30, 1993 and entitled "ROTATION REGISTER FOR ORTHOGONAL DATA TRANSFORMATION";

U.S. patent application Ser. No. 08/159,652 filed Nov. 30, 1993 "MEDIAN FILTER METHOD, CIRCUIT AND SYSTEM";

U.S. patent application Ser. No. 08/159,344 filed Nov. 30, 1993 and entitled "ARITHMETIC LOGIC UNIT WITH CONDITIONAL REGISTER SOURCE SELECTION";

U.S. patent application Ser. No. 08/160,301 filed Nov. 30, 1993 and entitled "APPARATUS, SYSTEM AND METHOD FOR DIVISION BY ITERATION"

U.S. patent application Ser. No. 08/159,650 filed Nov. 30, 1993 and entitled "MULTIPLY ROUNDING USING REDUNDANT CODED MULTIPLY RESULT";

U.S. patent application Ser. No. 08/159,349 filed Nov. 30, 1993 and entitled "SPLIT MULTIPLY OPERATION";

U.S. patent application Ser. No. 08/158,741 filed Nov. 30, 1993 and entitled "MIXED CONDITION TEST CONDITIONAL AND BRANCH OPERATIONS INCLUDING CONDITIONAL TEST FOR ZERO";

U.S. patent application Ser. No. 08/160,302 filed Nov. 30, 1993 and entitled "PACKED WORD PAIR MULTIPLY OPERATION";

U.S. patent application Ser. No. 08/160,573 filed Nov. 30, 1993 and entitled "THREE INPUT ARITHMETIC LOGIC UNIT WITH SHIFTER"

U.S. patent application Ser. No. 08/159,282 filed Nov. 30, 1993 and entitled "THREE INPUT ARITHMETIC LOGIC UNIT WITH MASK GENERATOR";

U.S. patent application Ser. No. 08/160,111 filed Nov. 30, 1993 and entitled "THREE INPUT ARITHMETIC LOGIC UNIT WITH BARREL ROTATOR AND MASK GENERATOR";

U.S. patent application Ser. No. 08/160,298 filed Nov. 30, 1993 and entitled "THREE INPUT ARITHMETIC LOGIC UNIT WITH SHIFTER AND MASK GENERATOR";

U.S. patent application Ser. No. 08/159,345 filed Nov. 30, 1993 and entitled "THREE INPUT ARITHMETIC LOGIC UNIT FORMING THE SUM OF A FIRST INPUT ADDED WITH A FIRST BOOLEAN COMBINATION OF A SECOND INPUT AND THIRD INPUT PLUS A SECOND BOOLEAN COMBINATION OF THE SECOND AND THIRD INPUTS";

U.S. patent application Ser. No. 08/160,113 filed Nov. 30, 1993 and entitled "THREE INPUT ARITHMETIC LOGIC UNIT FORMING THE SUM OF FIRST BOOLEAN COMBINATION OF FIRST, SECOND AND THIRD INPUTS PLUS A SECOND BOOLEAN COMBINATION OF FIRST, SECOND AND THIRD INPUTS";

U.S. patent application Ser. No. 08/159,640 filed Nov. 30, 1993 and entitled "THREE INPUT ARITHMETIC LOGIC UNIT EMPLOYING CARRY PROPAGATE LOGIC";

U.S. patent application Ser. No. 08/160,300 filed Nov. 30, 1993 and entitled "DATA PROCESSING APPARATUS, SYSTEM AND METHOD FOR IF, THEN, ELSE OPERATION USING WRITE PRIORITY";

U.S. patent application Ser. No. 08/208,413 filed Mar. 8, 1994 and entitled "TRANSPARENCY AND PLANE MASKING IN TP TRANSFER PROCESSOR";

U.S. patent application Ser. No. 08/208,161 filed Mar. 8, 1994 and entitled "PIXBLT WITH TRANSPARENCY";

U.S. patent application Ser. No. 08/208,171 filed Mar. 8, 1994 and entitled "MESSAGE PASSING AND BLAST INTERRUPT FROM PROCESSOR";

U.S. patent application Ser. No. 08/209,123 filed Mar. 8, 1994 and entitled "GUIDED TRANSFERS WITH X,Y DIMENSION AND VARIABLE STEPPING";

U.S. patent application Ser. No. 08/209,124 filed Mar. 8, 1994 and entitled "GUIDED TRANSFER LINE DRAWING";

U.S. patent application Ser. No. 08/208,517 filed Mar. 8, 1994 and entitled "TRANSFER PROCESSOR MEMORY INTERFACE CONTROLS DIFFERENT MEMORY TYPES SIMULTANEOUSLY"; and U.S. patent application Ser. No. 08/207,503 filed Mar. 8, 1994 and entitled "ARCHITECTURE OF TP TRANSFER PROCESSOR".

U.S. patent application Ser. No. 08/207,987 filed Mar. 8, 1993 and entitled "MP VECTOR INSTRUCTIONS FP+LOAD/STORE";

U.S. patent application Ser. No. 08/207,992 filed Mar. 8, 1993 and entitled "NORMALIZATION METHOD FOR FLOATING POINT NUMBERS".

This application is related to the following contemporaneously filed applications:

U.S. patent application Ser. No. 08/399,083 (TI-18966) "LEFT AND RIGHT JUSTIFICATION OF SINGLE PRECISION MANTISSA IN A DOUBLE PRECISION ROUNDING UNIT".

TECHNICAL FIELD OF THE INVENTION

The technical field of this invention is the field of digital data processing and more particularly microprocessor circuits, architectures and methods for digital data processing especially digital image/graphics processing.

BACKGROUND OF THE INVENTION

The inventive embodiments have many applications some of which relate to the field of computer graphics, discussed herein as an illustrative background. In a field of computer graphics known as bit mapped graphics, computer memory stores data for each individual picture element or pixel of an image at memory locations that correspond to the location of that pixel within the image. This image may be an image to be displayed or a captured image to be manipulated, stored, displayed or retransmitted. The field of bit mapped computer graphics has benefited greatly from the lowered cost and increased capacity of dynamic random access memory (DRAM) and the lowered cost and increased processing power of microprocessors. These advantageous changes in the cost and performance of component parts enable larger and more complex computer image systems to be economically feasible.

The field of bit mapped graphics has undergone several stages in evolution of the types of processing used for image data manipulation. Initially a computer system supporting bit mapped graphics employed the system processor for all bit mapped operations. This type of system suffered several drawbacks. First, the computer system processor was not particularly designed for handling bit mapped graphics. Design choices that are very reasonable for general purpose computing are unsuitable for bit mapped graphics systems. Consequently some routine graphics tasks operated slowly. In addition, it was quickly discovered that the processing needed for image manipulation of bit mapped graphics was so loading the computational capacity of the system processor that other operations were also slowed.

The next step in the evolution of bit mapped graphics processing was dedicated hardware graphics controllers. These devices can draw simple figures, such as lines, ellipses and circles, under the control of the system processor. Some of these devices can also do pixel block transfers (PixBlt). A pixel block transfer is a memory move operation of image data from one portion of memory to another. A pixel block transfer is useful for rendering standard image elements, such as alphanumeric characters in a particular type font, within a display by transfer from nondisplayed memory to bit mapped display memory. This function can also be used for tiling by transferring the same small image to the whole of bit mapped display memory. Built-in algorithms for performing some of the most frequently used graphics functions provide a way of improving system performance. Also a graphics computer system may desirably include other functions besides those few that are implemented in such a hardware graphics controller. These additional functions might be implemented in software by the system processor. These hardware graphics controllers will typically allow the system processor only limited access to the bit map memory. This limits the degree to which system software can augment the fixed set of functions of the hardware graphics controller.

The graphics system processor represents yet a further step in the evolution of bit mapped graphics processing. A graphics system processor is a programmable device that has all the attributes of a microprocessor and also includes special functions for bit mapped graphics. The TMS34010 and TMS34020 graphics system processors manufactured by Texas Instruments Incorporated represent this class of devices. These graphics system processors respond to a stored program in the same manner as a microprocessor and include the capability of data manipulation via an arithmetic logic unit, data storage in register files and control of both program flow and external data memory. In addition, these devices include special purpose graphics manipulation hardware that operate under program control. Additional instructions within the instruction set of these graphics system processors control the special purpose graphics hardware. These instructions and the hardware that supports them are selected to perform base level graphics functions that are useful in many contexts. Thus a graphics system processor can be programmed for many differing graphics applications using algorithms selected for the particular problem. This provides an increase in usefulness similar to that provided by changing from hardware controllers to programmed microprocessors. Because such graphics system processors are programmable devices in the same manner as microprocessors, they can operate as stand alone graphics processors, graphics co-processors slaved to a system processor or tightly coupled graphics controllers.

Several fields would desirably utilize more cost effective, powerful graphics operations to be economically feasible. These include video conferencing, multi-media computing with full motion video, high definition television, color facsimile, smart photocopiers, image recognition systems and digital photography, among other examples. Each of these fields presents unique problems. Image data compression and decompression are common themes in some of these applications. The amount of transmission bandwidth and the amount of storage capacity required for images and particular full motion video is enormous. Without efficient video compression and decompression that result in acceptable final image quality, these applications will be limited by the costs associated with transmission bandwidth and storage capacity. There is also a need in the art for a single system that can support both image processing functions such as image recognition and graphics functions such as display control.

SUMMARY OF THE INVENTION

A magnitude comparator employs plural layers of repeated circuits which are scalable to any size. The magnitude comparator indicates whether two multibit inputs are equal, and if not equal indicates if a first multibit input is greater than a second multibit input. A single bit comparator circuit receives a corresponding bit of the two multibit inputs. Each single bit comparator generates an A=B output equal to the exclusive NOR of the two inputs and an A>B output equal to the first input. The magnitude comparator includes at least one two bit comparator circuit disposed in at least one layer. Each two bit comparator circuit includes an A[0]=B[0] input, an A[0]>B[0] input, an A[1]=B[1] input and an A[1]>B[1] input. Each two bit comparator circuit generates an A=B output of an AND of signals received at the A[0]=B[0] and A[1]=B[1] inputs. Each two bit comparator circuit generates an A>B output equal to the A[1]>B[1] input if the A[0]=B[0] input is "1" and equal to the A[0]>B[0] input if the A[0]=B[0] input is "0". A first layer of said two bit comparators each have the A[0]=B[0] and the A[0]>B[0] inputs connected to the respective A=B and the A>B outputs of a first single bit comparator circuits, the A[1]=B[1] and A[1]>B[1] inputs connected to the respective A=B and A>B outputs of a second single bit comparator corresponding to the next most significant bit. Subsequent layers of the two bit comparators have inputs connected to prior comparator circuits. A last two bit comparator circuits forms the magnitude comparator output. This magnitude comparator circuit is useful in floating point arithmetic logic units to determine the relative magnitude of the exponents of two floating point numbers.

BRIEF DESCRIPTION OF THE FIGURES

These and other aspects of the present invention are described below together with the Figures, in which:

FIG. 7 illustrates the control registers of the master processor;

FIG. 8 illustrates the integer pipeline operation of the master processor;

FIGS. 9a–9c illustrates the instruction formats of the master processor;

FIG. 19 illustrates an example of left justified single precision rounding according to the prior art;

FIG. 20 illustrates an example of right justified single precision rounding according to the prior art;

FIG. 21 illustrates combined left/right justified single precision rounding according to this invention;

FIG. 25 illustrates an example embodiment of a high definition television system; and FIG. 26 illustrates an example of color facsimile system including a multiprocessor integrated circuit having a single digital image/graphics processor.

DETAILED DESCRIPTION OF PREFERRED EMBODIMENTS

Figure 1:
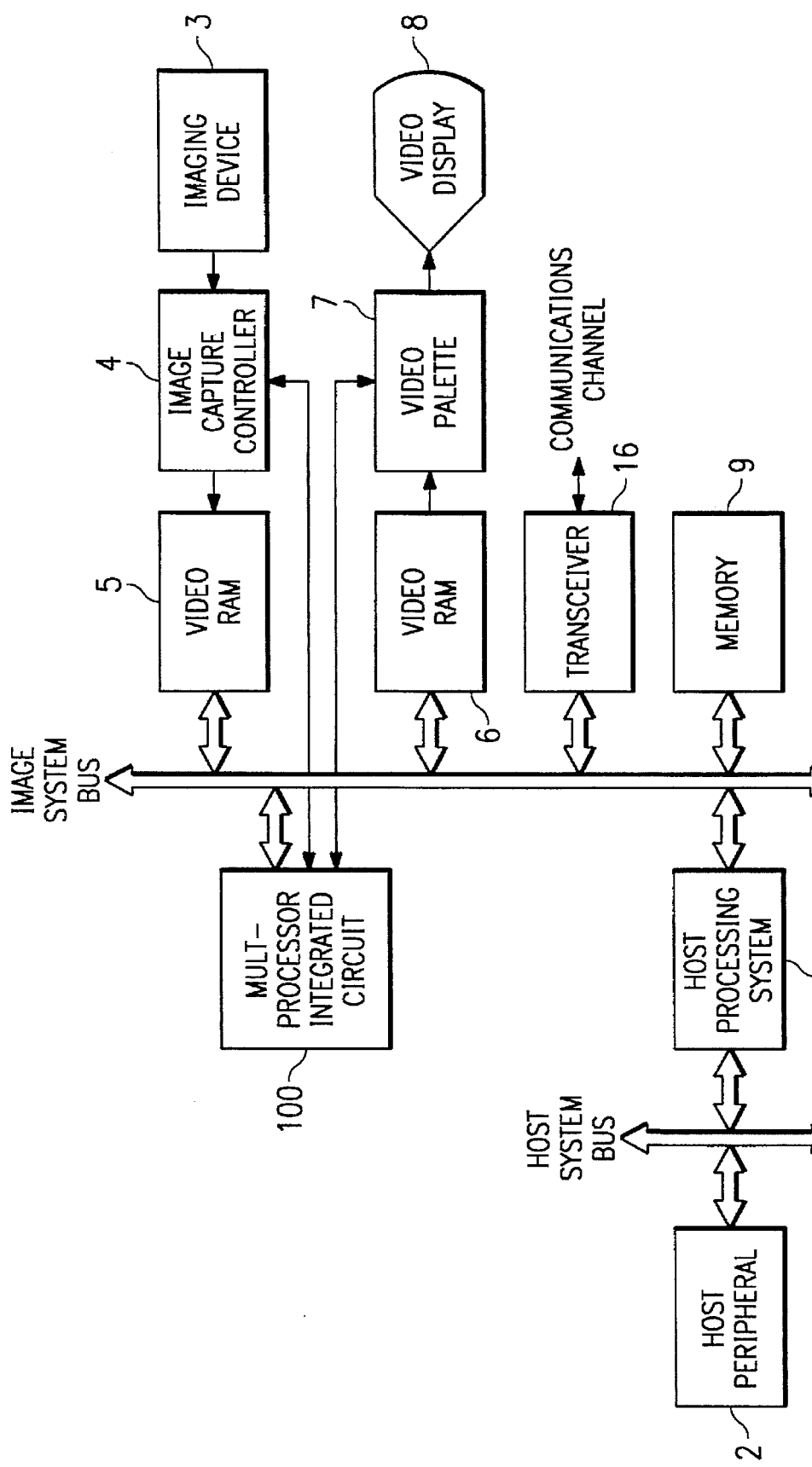
FIG. 1 illustrates the system architecture of an image processing system such as would employ this invention.

FIG. 1 is a block diagram of an image data processing system including a multiprocessor integrated circuit constructed for image and graphics processing according to this invention. This data processing system includes a host processing system 1. Host processing system 1 provides the data processing for the host system of data processing system of FIG. 1. Included in the host processing system 1 are a processor, at least one input device, a long term storage device, a read only memory, a random access memory and at least one host peripheral 2 coupled to a host system bus. Because of its processing functions, the host processing system 1 controls the function of the image data processing system.

Multiprocessor integrated circuit 100 provides most of the data processing including data manipulation and computation for image operations of the image data processing system of FIG. 1. Multiprocessor integrated circuit 100 is bi-directionally coupled to an image system bus and communicates with host processing system 1 by way of this image system bus. In the arrangement of FIG. 1, multiprocessor integrated circuit 100 operates independently from the host processing system 1. The multiprocessor integrated circuit 100, however, is responsive to host processing system 1.

FIG. 1 illustrates two image systems. Imaging device 3 represents a document scanner, charge coupled device scanner or video camera that serves as an image input device. Imaging device 3 supplies this image to image capture controller 4, which serves to digitize the image and form it into raster scan frames. This frame capture process is controlled by signals from multiprocessor integrated circuit 100. The thus formed image frames are stored in video random access memory 5. Video random access memory 5 may be accessed via the image system bus permitting data transfer for image processing by multiprocessor integrated circuit 100.

The second image system drives a video display. Multiprocessor integrated circuit 100 communicates with video random access memory 6 for specification of a displayed image via a pixel map. Multiprocessor integrated circuit 100 controls the image data stored in video random access memory 6 via the image system bus. Data corresponding to this image is recalled from video random access memory 6 and supplied to video palette 7. Video palette 7 may transform this recalled data into another color space, expand the number of bits per pixel and the like. This conversion may be accomplished through a look-up table. Video palette 7 also generates the proper video signals to drive video display 8. If these video signals are analog signals, then video palette 7 includes suitable digital to analog conversion. The video level signal output from the video palette 7 may include color, saturation, and brightness information. Multiprocessor integrated circuit 100 controls data stored within the video palette 7, thus controlling the data transformation process and the timing of image frames. Multiprocessor integrated circuit 100 can control the line length and the number of lines per frame of the video display image, the synchronization, retrace, and blanking signals through control of video palette 7. Significantly, multiprocessor integrated circuit 100 determines and controls where graphic display information is stored in the video random access memory 6. Subsequently, during readout from the video random access memory 6, multiprocessor integrated circuit 100 determines the readout sequence from the video random access memory 6, the addresses to be accessed, and control information needed to produce the desired graphic image on video display 8.

Video display 8 produces the specified video display for viewing by the user. There are two widely used techniques. The first technique specifies video data in terms of color, hue, brightness, and saturation for each pixel. For the second technique, color levels of red, blue and green are specified for each pixel. Video palette 7 the video display 8 is designed and fabricated to be compatible with the selected technique.

FIG. 1 illustrates an additional memory 9 coupled to the image system bus. This additional memory may include additional video random access memory, dynamic random access memory, static random access memory or read only memory. Multiprocessor integrated circuit 100 may be controlled either in wholly or partially by a program stored in the memory 9. This memory 9 may also store various types of graphic image data. In addition, multiprocessor integrated circuit 100 preferably includes memory interface circuits for video random access memory, dynamic random access memory and static random access memory. Thus a system could be constructed using multiprocessor integrated circuit 100 without any video random access memory 5 or 6.

FIG. 1 illustrates transceiver 16. Transceiver 16 provides translation and bidirectional communication between the image system bus and a communications channel. One example of a system employing transceiver 16 is video conferencing. The image data processing system illustrated in FIG. 1 employs imaging device 3 and image capture controller 4 to form a video image of persons at a first location. Multiprocessor integrated circuit 100 provides video compression and transmits the compressed video signal to a similar image data processing system at another location via transceiver 16 and the communications channel. Transceiver 16 receives a similarly compressed video signal from the remote image data processing system via the communications channel. Multiprocessor integrated circuit 100 decompresses this received signal and controls video random access memory 6 and video palette 7 to display the corresponding decompressed video signal on video display 8. Note this is not the only example where the image data processing system employs transceiver 16. Also note that the bidirectional communications need not be the same type signals. For example, in an interactive cable television signal the cable system head in would transmit compressed video signals to the image data processing system via the communications channel. The image data processing system could transmit control and data signals back to the cable system head in via transceiver 16 and the communications channel.

FIG. 1 illustrates multiprocessor integrated circuit 100 embodied in a system including host processing system 1. Those skilled in the art would realize from the disclosure the preferred embodiments of the invention that multiprocessor integrated circuit 100 may also be employed as the only processor of a useful system. In such a system multiprocessor integrated circuit 100 is programmed to perform all the functions of the system.

This multiprocessor integrated circuit 100 is particularly useful in systems used for image processing. Multiprocessor integrated circuit 100 preferably includes plural identical processors. Each of these processors will be called a digital image/graphics processor. This description is a matter of convenience only. The processor embodying this invention can be a processor separately fabricated on a single integrated circuit or a plurality of integrated circuits. If embodied on a single integrated circuit, this single integrated circuit may optionally also include read only memory and random access memory used by the digital image/graphics processor.

Figure 2:
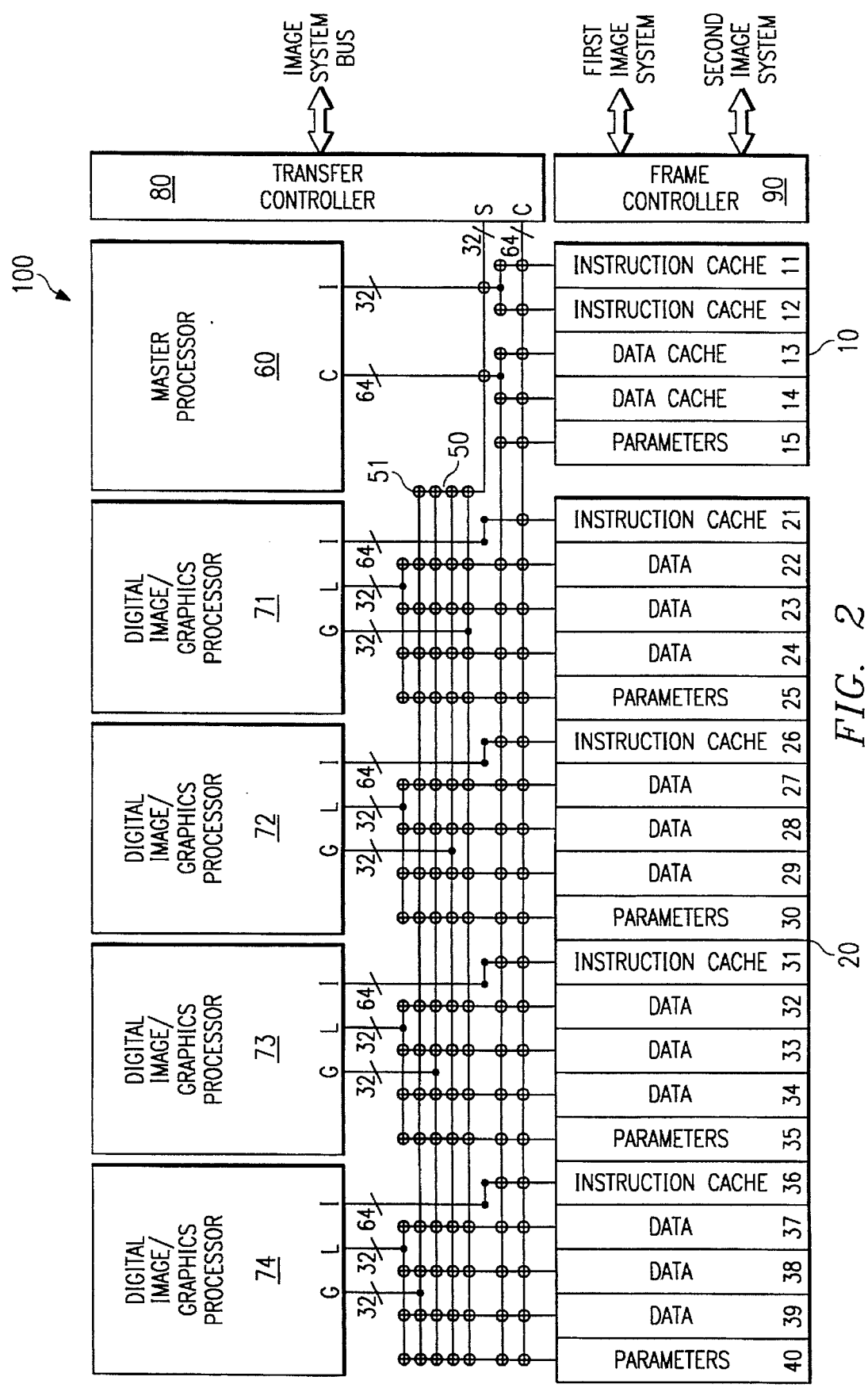
FIG. 2 illustrates the architecture of a single integrated circuit multiprocessor that forms the preferred embodiment of this invention.

FIG. 2 illustrates the architecture of the multiprocessor integrated circuit 100. Multiprocessor integrated circuit 100 includes: two random access memories 10 and 20, each of which is divided into plural sections; crossbar 50; master processor 60; digital image/graphics processors 71, 72, 73 and 74; transfer controller 80, which mediates access to system memory; and frame controller 90, which can control access to independent first and second image memories. Multiprocessor integrated circuit 100 provides a high degree of operation parallelism, which will be useful in image processing and graphics operations, such as in the multimedia computing. Since there are computing applications other than image and graphics processing where these processors will be useful, reference to processors 71, 72, 73 and 74 as image/graphics processors is for convenience only.

Multiprocessor integrated circuit 100 includes two random access memories. Random access memory 10 is primarily devoted to master processor 60. It includes two instruction cache memories 11 and 12, two data cache memories 13 and 14 and a parameter memory 15. These memory sections can be physically identical, but connected and used differently. Random access memory 20 may be accessed by master processor 60 and each of the digital image/graphics processors 71, 72, 73 and 74. Each digital image/graphics processor 71, 72, 73 and 74 has five corresponding memory sections. These include an instruction cache memory, three data memories and one parameter memory. Thus digital image/graphics processor 71 has corresponding instruction cache memory 21, data memories 22, 23, 24 and parameter memory 25; digital image/graphics processor 72 has corresponding instruction cache memory 26, data memories 27, 28, 29 and parameter memory 30; digital image/graphics processor 73 has corresponding instruction cache memory 31, data memories 32, 33, 34 and parameter memory 35; and digital image/graphics processor 74 has corresponding instruction cache memory 36, data memories 37, 38, 39 and parameter memory 40. Like the sections of random access memory 10, these memory sections can be physically identical but connected and used differently. Each of these memory sections of memories 10 and 20 includes 2K bytes for example, with a total memory within multiprocessor integrated circuit 100 of 50K bytes.

Multiprocessor integrated circuit 100 is constructed to provide a high rate of data transfer between processors and memory using plural independent parallel data transfers. Crossbar 50 enables these data transfers. Each digital image/graphics processor 71, 72, 73 and 74 has three memory ports that may operate simultaneously each cycle. An instruction port (I) may fetch 64 bit data words from the corresponding instruction cache. A local data port (L) may read a 32 bit data word from or write a 32 bit data word into the data memories or the parameter memory corresponding to that digital image/graphics processor. A global data port (G) may read a 32 bit data word from or write a 32 bit data word into any of the data memories or the parameter memories or random access memory 20. Master Processor 60 includes two memory ports. An instruction port (I) may fetch a 32 bit instruction word from either of the instruction caches 11 and 12. A data port (C) may read a 32 bit data word from or write a 32 bit data word into data caches 13 or 14, parameter memory 15 of random access memory 10 or any of the data memories, the parameter memories or random access memory 20. Transfer controller 80 can access any of the sections of random access memory 10 or 20 via data port (C). Thus fifteen parallel memory accesses may be requested at any single memory cycle. Random access memories 10 and 20 are divided into 25 memories in order to support so many parallel accesses.

Crossbar 50 controls the connections of master processor 60, digital image/graphics processors 71, 72, 73 and 74, and transfer controller 80 with memories 10 and 20. Crossbar 50 includes a plurality of crosspoints 51 disposed in rows and columns. Each column of crosspoints 51 corresponds to a single memory section and a corresponding range of addresses. A processor requests access to one of the memory sections through the most significant bits of an address output by that processor. This address output by the processor travels along a row. The crosspoint 51 corresponding to the memory section having that address responds either by granting or denying access to the memory section. If no other processor has requested access to that memory section during the current memory cycle, then the crosspoint 51 grants access by coupling the row and column. This supplies the address to the memory section. The memory section responds by permitting data access at that address. This data access may be either a data read operation or a data write operation.

If more than one processor requests access to the same memory section simultaneously, then crossbar 50 grants access to only one of the requesting processors. The crosspoints 51 in each column of crossbar 50 communicate and grant access based upon a priority hierarchy. If two requests for access having the same rank occur simultaneously, then crossbar 50 grants access on a round robin basis, with the processor last granted access having the lowest priority. Each granted access lasts as long as needed to service the request. The processors may change their addresses every memory cycle, so crossbar 50 can change the interconnection between the processors and the memory sections on a cycle by cycle basis.

Master processor 60 preferably performs the major control functions for multiprocessor integrated circuit 100. Master processor 60 is preferably a 32 bit reduced instruction set computer (RISC) processor including a hardware floating point calculation unit. According to the RISC architecture, all accesses to memory are performed with load and store instructions and most integer and logical operations are performed on registers in a single cycle. The floating point calculation unit, however, will generally take several cycles to perform operations when employing the same register file as used by the integer and logical unit. A register score board ensures that correct register access sequences are maintained. The RISC architecture is suitable for control functions in image processing. The floating point calculation unit permits rapid computation of image rotation functions, which may be important to image processing.

Master processor 60 fetches instruction words from instruction cache memory 11 or instruction cache memory 12. Likewise, master processor 60 fetches data from either data cache 13 or data cache 14. Since each memory section includes 2K bytes of memory, there is 4K bytes of instruction cache and 4K bytes of data cache. Cache control is an integral function of master processor 60. As previously mentioned, master processor 60 may also access other memory sections via crossbar 50.

The four digital image/graphics processors 71, 72, 73 and 74 each have a highly parallel digital signal processor (DSP) architecture. Digital image/graphics processors 71, 72, 73 and 74 achieve a high degree of parallelism of operation employing three separate units: a data unit; an address unit; and a program flow control unit. These three units operate simultaneously on different instructions in an instruction pipeline. In addition each of these units contains internal parallelism.

The digital image/graphics processors 71, 72, 73 and 74 can execute independent instruction streams in the multiple instruction multiple data mode (MIMD). In the MIMD mode, each digital image/graphics processor executes an individual program from its corresponding instruction cache, which may be independent or cooperative. In the latter case crossbar 50 enables inter-processor communication in combination with the shared memory. Digital image/ graphics processors 71, 72, 73 and 74 may also operate in a synchronized MIMD mode. In the synchronized MIMD mode, the program control flow unit 130 of each digital image/graphics processor inhibits fetching the next instruction until all synchronized processors are ready to proceed. This synchronized MIMD mode allows the separate programs of the digital image/graphics processors to be executed in lock step in a closely coupled operation.

Digital image/graphics processors 71, 72, 73 and 74 can execute identical instructions on differing data in the single instruction multiple data mode (SIMD). In this mode a single instruction stream for the four digital image/graphics processors comes from instruction cache memory 21. Digital image/graphics processor 71 controls the fetching and branching operations and crossbar 50 supplies the same instruction to the other digital image/graphics processors 72, 73 and 74. Since digital image/graphics processor 71 controls instruction fetch for all the digital image/graphics processors 71, 72, 73 and 74, the digital image/graphics processors are inherently synchronized in the SIMD mode.

Transfer controller 80 is a combined direct memory access (DMA) machine and memory interface for multiprocessor integrated circuit 100. Transfer controller 80 intelligently queues, sets priorities and services the data requests and cache misses of the five programmable processors. Master processor 60 and digital image/graphics processors 71, 72, 73 and 74 all access memory and systems external to multiprocessor integrated circuit 100 via transfer controller 80. Data cache or instruction cache misses are automatically handled by transfer controller 80. The cache service (S) port transmits such cache misses to transfer controller 80. Cache service port (S) reads information from the processors and not from memory. Master processor 60 and digital image/ graphics processors 71, 72, 73 and 74 may request data transfers from transfer controller 80 as linked list packet transfers. These linked list packet transfers allow multi-dimensional blocks of information to be transferred between source and destination memory addresses, which can be within multiprocessor integrated circuit 100 or external to multiprocessor integrated circuit 100. Transfer controller 80 preferably also includes a refresh controller for dynamic random access memory (DRAM) which require periodic refresh to retain their data.

Frame controller 90 is the interface between multiprocessor integrated circuit 100 and external image capture and display systems. Frame controller 90 provides control over capture and display devices, and manages the movement of data between these devices and memory automatically. To this end, frame controller 90 provides simultaneous control over two independent image systems. These would typically include a first image system for image capture and a second image system for image display, although the application of frame controller 90 is controlled by the user. These image systems would ordinarily include independent frame memories used for either frame grabber or frame buffer storage. Frame controlled 90 preferably operates to control video dynamic random access memory (VRAM) through refresh and shift register control.

Multiprocessor integrated circuit 100 is designed for large scale image processing. Master processor 60 provides embedded control, orchestrating the activities of the digital image/graphics processors 71, 72, 73 and 74, and interpreting the results that they produce. Digital image/graphics processors 71, 72, 73 and 74 are well suited to pixel analysis and manipulation. If pixels are thought of as high in data but low in information, then in a typical application digital image/graphics processors 71, 72, 73 and 74 might well examine the pixels and turn the raw data into information. This information can then be analyzed either by the digital image/graphics processors 71, 72, 73 and 74 or by master processor 60. Crossbar 50 mediates inter-processor communication. Crossbar 50 allows multiprocessor integrated circuit 100 to be implemented as a shared memory system. Message passing need not be a primary form of communication in this architecture. However, messages can be passed via the shared memories. Each digital image/graphics processor, the corresponding section of crossbar 50 and the corresponding sections of memory 20 have the same width in this embodiment. This permits architecture flexibility by accommodating the addition or removal of digital image/ graphics processors and corresponding memory modularly while maintaining the same pin out.

In one embodiment all parts of multiprocessor integrated circuit 100 are disposed on a single integrated circuit, which is formed in complementary metal oxide semiconductor (CMOS) using feature sizes of 0.6 μm. Multiprocessor integrated circuit 100 is suitably constructed in a pin grid array package having 256 pins. The inputs and outputs are compatible with transistor-transistor logic (TTL) logic voltages for example. Multiprocessor integrated circuit 100 includes about 3 million transistors and employs a clock rate of 50 MHz.

Master processor 60 is a 32 bit RISC (reduced instruction set computer) processor the employs a load/store architecture and 3 operand arithmetic and logical instructions. Master processor 60 includes thirty one 32 bit general purpose registers and IEEE standard 754 floating point hardware. The instruction set supports both 15 bit and 32 bit immediate constants. The instruction set includes vector instructions that Initiate a floating point operation and a parallel load or store in one instruction.

Figure 3:
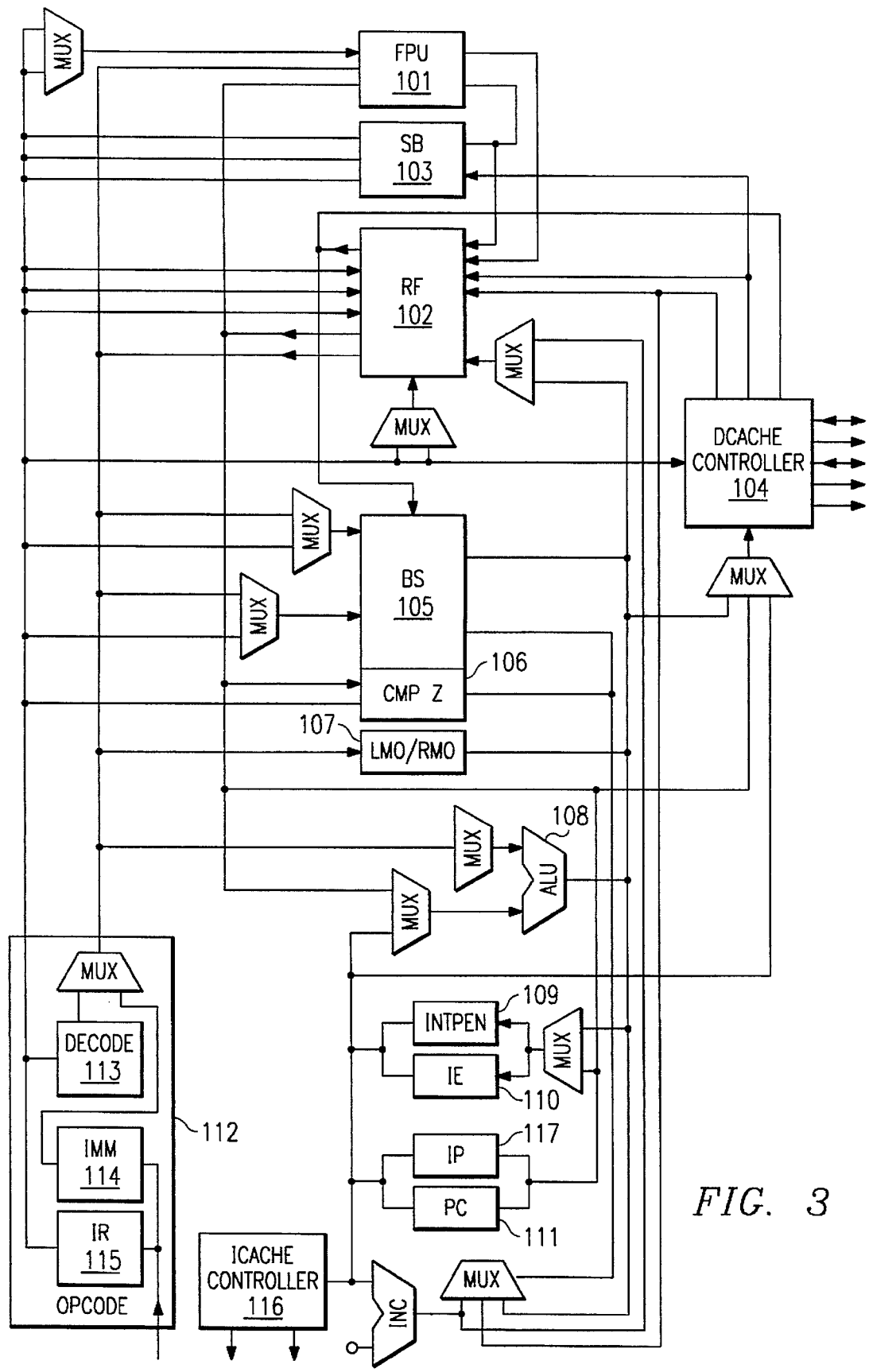
FIG. 3 illustrates the architecture of the master processor in the preferred embodiment of this invention.

FIG. 3 shows a simplified diagram of master processor 60. Major blocks of master processor 60 are: a floating point unit (FPU) 101; a register file (RF) 102; a register scoreboard (SB) 103 that ensures results of floating point operations and memory loads are available before they are used as sources and arbitrates between data cache and floating point unit 101 for access to their shared write port to register file 102; a data cache controller 104 which also handles the interface to the on-chip memory via the crossbar and to external memory via transfer processor 80; a barrel shifter (BS) 105 that performs shift instructions; compare to zero logic 106; left most one/right most one detection logic (LMO/RMO) 107; integer arithmetic logic unit (ALU) 108 used for add, subtract and logical operations and to compute branch target address during relative branches; interrupt pending register (INTPEN) 109 that receives master processor interrupt signals; interrupt enable register (IE) 110 that selectively enables or disables interrupts; program counter register (PC) 111 holds the address of the instruction to be fetched; program counter incrementer (INC) 112 that increments program counter 111 to point to the next instruction, with the incremented value can also be routed to the register file as a "return" or "link" address; instruction decode logic (DECODE) 113 that decodes instruction and supplies control signals to the operating units; instruction register (IR) 114 that holds the address of the instruction being executed; immediate register (IMM) 115 that stores any instruction immediate data; and the instruction cache controller (ICACHE) 116,, that provides instructions to be executed, interfaces to transfer processor 80 for cache fills.

Figure 4A:
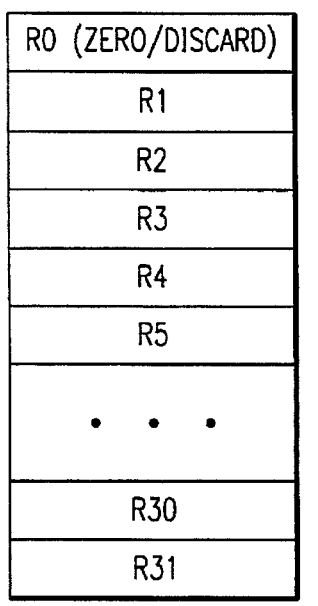
FIGS. 4a–4b illustrates the organization of the data registers of the master processor.
Figure 4B:
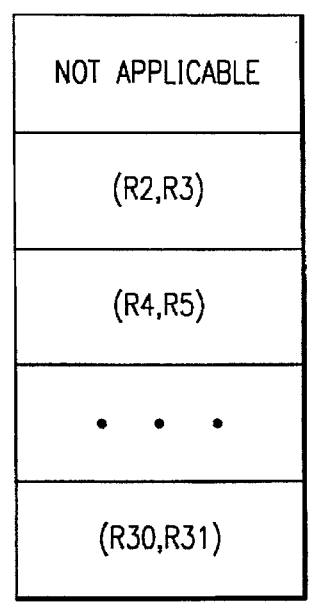

A programmers model of register file 102 of master processor 60 is illustrated in FIG. 4. Register file 102 has thirty one 32 bit general purpose registers R1 to R31 in register file 102. The thirty second general purpose register would be R0, however R0 is not a true register as it always reads as zero and writes to it are discarded. These may be addressed individually in single precision as shown in FIG. 4a. Double precision values are stored in an even-odd pair as illustrated in FIG. 4b. The higher numbered register always holds the sign bit and the exponent. The higher numbered register holds additional mantissa. Since R0 always reads as zero, the R0/R1 pair of registers is not available for double precision use. In addition R1 is illegal as the destination of any operation which is executed by the floating point unit. To keep the registers with special uses contiguous the following software convention is suggested:

R0—Hardware zero
R1—Stack pointer
R2—Frame Pointer (If required)
R3—Link (Return Address) Register
R30—Compiler "status" register
R31—Reserved for assembler to generate pseudo-operations.

FIGS. 5 and 6 illustrate how data is stored in the data registers R1 to R31 of register files 102. FIG. 5 illustrates single precision mode employing 32 bits. FIG. 5a shows storage of an 8 bit signed integer. The 7 bits of the integer I are stored in the least significant bits 6-0. The sign bit S is stored in bit 7 and repeated in bits 31-8. FIG. 5b shows storage of an 8 bit unsigned integer. The 8 bits of the unsigned integer U are stored in the least significant bits 7-0 and the 24 most significant bits are filled with "0". FIG. 5c shows storage of a 16 bit signed integer. The 15 bits of the integer I are stored in the least significant bits 15-0. The sign bit S is stored in bit 16 and repeated in bits 31-17. FIG. 5d shows storage of a 16 bit unsigned integer. The 16 bits of the unsigned integer U are stored in the least significant bits 15-0 and the 16 most significant bits are filled with "0". FIG. 5e shows storage of a 32 bit signed integer. The 31 bits of the integer I are stored in bits 30-0 and the sign bit S is stored in bit 31. FIG. 5f shows storage of 32 bit unsigned integer. The 32 bits of the unsigned integer U fill the register.

Figure 5A:
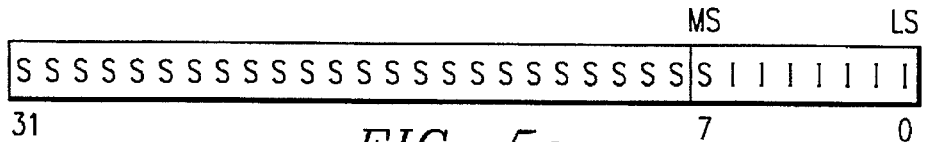
FIGS. 5a–5g illustrates examples of the manner of storage of single precision data in the registers of the master processor.
Figure 5B:
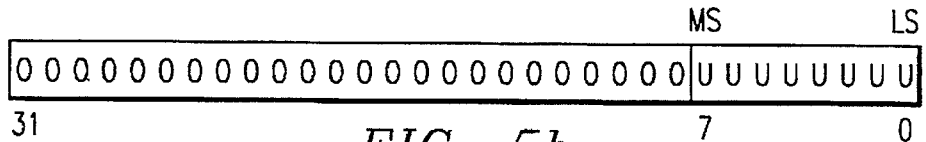
Figure 5C:
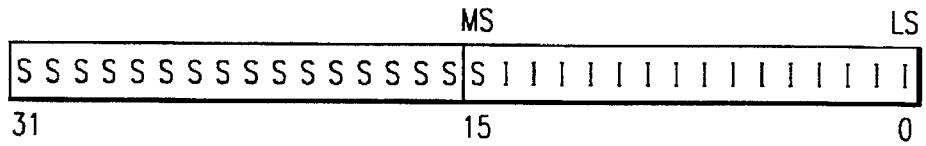
Figure 5D:
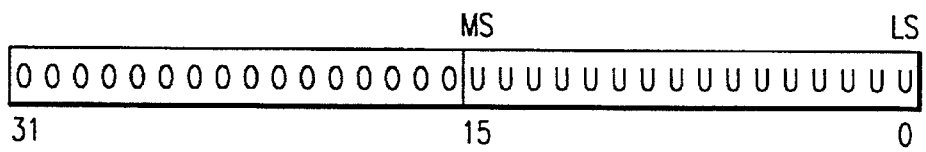
Figure 5E:
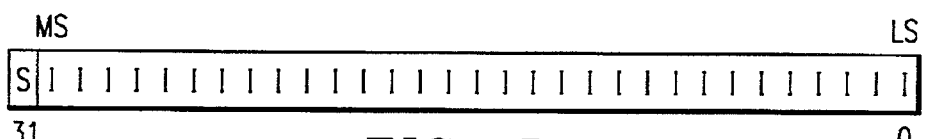
Figure 5F:
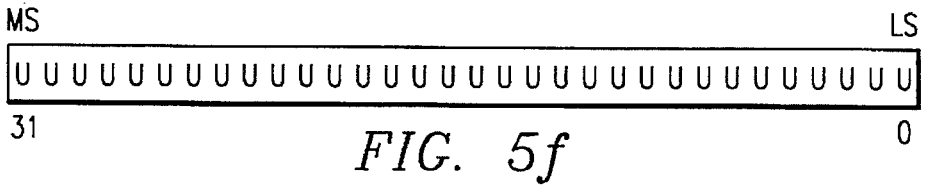
Figure 5G:

FIG. 5g illustrates the storage of a 32 bit floating point number. The sign is stored in the most significant bit 31. Bits 30-23 store 8 bits of a binary exponent. According the convention these 8 bits employ a bias of decimal 127, thus binary "10000000" represents $2^0$. As will be further explained below, a normalized floating point number always has a binary mantissa between 1 and 2. Therefore the leading "1" is implied rather than specifically stored. Bits 22-0 store the fractional part of the mantissa. This format results in an expressed number:

$$SP=(-1)^S\times(1+M)\times2^{(E-127)}$$

where: SP is the single precision expressed number; S is the sign; M equals the fractional mantissa; and E is the exponent.

Figure 6A:
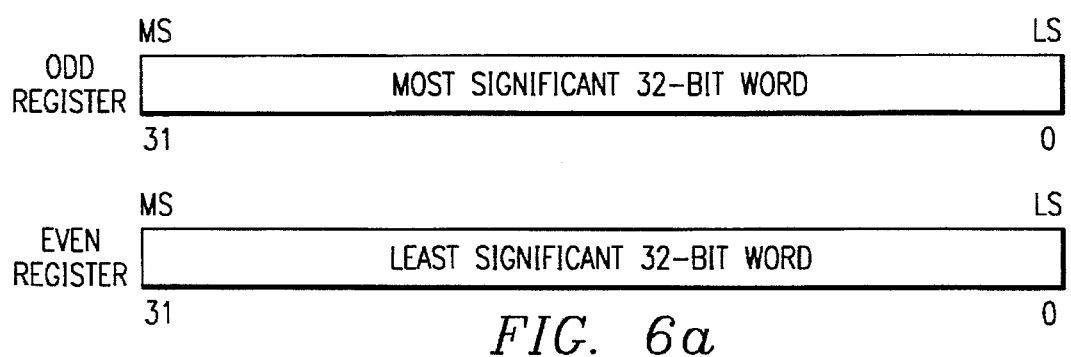
FIGS. 6a–6b illustrates examples of the manner of storage of double precision data in the registers of the master processor.
Figure 6B:
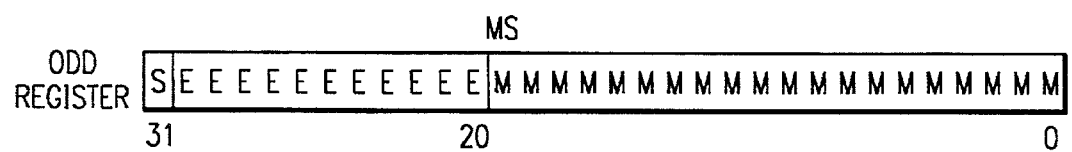

FIG. 6 illustrates data storage in double precision mode employing 64 bits. FIG. 6a illustrates storage of a 64 bit integer. Note that the odd register stores the most significant bits and the even register stores the least significant bits. FIG. 6b illustrates storage of a 64 bit floating point number. Bit 31 of the odd register stores the sign. Bits 30-20 of the odd register store 11 bits of binary exponent. By convention this exponent is expressed with a bias of 1023. Bits 19-0 of the odd register store the 20 most significant bits of the fractional part of the mantissa. The even register stores the 32 least significant bits of the mantissa. This format results in an expressed number:

$$DP=(-1)^S\times(1+M)\times2^{(E-1023)}$$

where: DP is the single precision expressed number; S is the sign; M equals the fractional mantissa; and E is the exponent.

FIG. 7 illustrates the control registers of master processor 60. Some of these control registers were previously described in conjunction with FIG. 3. Floating point status register FPST 118 will be further described below.

Configuration register CONFIG. 119 allows certain aspects of the MVP to be configured by the user. Configuration register CONFIG. 119 includes: a bit that reflects the current endian mode, big endian or little endian; a bit that enables the round robin crossbar prioritization the global and local buses of digital image/graphics processors 71, 72, 73 and 74; a bit that disables the round-robin prioritization of packet requests by transfer controller 60; . If the bit is set to one, the priorities are fixed.

Registers TCOUNT 120 and TSCALE 121 are part of a timer in the master processor 60 employed to provide an on-chip time reference. Register TCOUNT 120 is a down counter which decrements by one on every clock. Register TSCALE 121 contains the value with which register TCOUNT 120 is re-loaded when it reaches zero. This sets the time between interrupts. When the count stored in register TCOUNT reaches zero the timer generates an interrupt to 60 master processor and register TCOUNT 120 is re-loaded from register TSCALE 120. The interrupt handler may read register TCOUNT 120 to determine the time that has elapsed since the last timer interrupt was posted.

The fault interface register FLTINF 122, the fault cache tag register FLTTAG 123, the fault address register FLTADD 124 and the two fault data registers FLTDTH 125 and FLTDTL 126 are employed to aid in recover from external memory faults. These may include faults relating to instruction cache 11 and 12, and data caches 13 and 14. The fault interface register FLTINF 122 stores data relating to the type of fault encountered. These include the type of operation (load, store, direct external access, cache flush etc.), the data size, whether the fault was on instruction cache or data cache and the block number of the cache block where the fault occurred. Fault cache tag register FLTTAG 123 stores the cache tag data upon encountering the external memory fault. Fault address register FLTADD 124 stores the memory address that resulted in an external memory fault. Fault data high register FLTDTH 125 stores the 32 most significant bits and fault data low register FLTDTL 126 stores the 32 least significant bits of data to be written which resulted in an external memory fault. If the data size was 32 bits or less, all the write data is stored in fault data low register FLTDTL 126.

Processor error register PPERROR 127 receives a posting of when one of digital image/graphics processors 71, 72, 737 or 74 detects an illegal instruction. This causes an interrupt of master processor 60. The interrupt handler of master processor 60 can examine processor error register PPERROR 127 to determine the cause.

Packet request register PKTREQ 128 controls submission of packet transfers to transfer controller 80.

Input pointers IN0P 129 and IN1P 130 and output pointer OUTP 131 are used in vector load and store operations, respectively. Vector load and store operations are similar to normal register load and register store operations. They differ in that the target addresses are stored in these register pointers, which are auto-incremented following memory access to point to the next memory word. This auto-increment differs based upon whether the vector load or store is single precision or double precision. In addition, vector load and store operations can take place in parallel with certain floating point operations. This will be further described below.

FIG. 8 shows the basic pipeline used in master processor 60. Master processor 60 has a three stage pipeline including fetch, execute and memory stages. FIG. 8 shows how three instructions through the pipeline. During the fetch stage of the pipeline program counter 110 is used to address the instruction cache and read a 32 bit instruction. During the execute stage the instruction is decoded, the source operands read from the register file, the operation performed, and a result written back to the register file. The memory stage is only present for load and store operations. The address calculated during the execute stage is used to address the data cache and the data are read or written. If a miss occurs on the instruction cache, the fetch and execute pipelines are stalled until the request can be serviced. If a miss occurs on the data cache, the memory pipeline stalls, but the fetch and execute pipelines continue to flow, until another memory operation needs to be initiated.

The register scoreboard 103 is a set of 1 bit flags, two for each of the general purpose registers. One scoreboard bit indicates that the register is waiting for a memory load to complete. The other scoreboard bit indicates that the register is waiting for a floating point operation to complete. The appropriate bit is set during the execute stage by any instruction which will not complete, that is write its results back to the register file, during the execute stage. This includes all the load instructions, floating-point instructions, and integer multiply.

When the operands are read from the register file at the beginning of the execute stage the scoreboard bits for the source and destination registers are also accessed. If any scoreboard bits are set, then the pipeline stalls and update of the pipeline registers, and the destination register is inhibited. This causes the same instruction to be attempted on the next cycle. Eventually the floating point unit or the memory unit completes its operation, which clears the corresponding scoreboard bits. The stalled instruction is then allowed to complete. There are two bits to allow the bits relating to floating point operations to be temporarily removed from register scoreboard 103 while the floating point unit 101 is stalled due to an exception.

The above pipeline implies one branch delay slot. Program counter 110 is loaded by branch instructions at the end of the execute stage. The new value is used for a fetch in next cycle. Thus one instruction in the old stream is fetched in parallel with the execute stage of the branch instruction. There is at least one load delay slot. Data are loaded from memory via the data cache at the end of the memory stage. Thus it is not available for use by the instruction following the load. This fact is recorded in the register scoreboard 103 and if the following instruction uses the load's destination register as a source the pipeline freezes until the data are available. In fact, if a data cache miss occurs the load can take substantially longer than one cycle. In this case the scoreboard bit is not cleared until the load completes.

Where possible, instructions should be scheduled to allow for this behavior. That is, at least one instruction which does not depend on the value loaded should follow the load, and additional instructions would be beneficial in hiding cache misses. However, if instructions cannot be found there is no need to insert nop instructions because register scoreboard 103 automatically causes the pipeline to stall. The delayed load also implies an extra write port to the register file. As the data are not available during the execute stage they do not use the normal port at that time. When the data do arrive the normal port typically is in use so they use one of their own. A delayed load and a non-delayed operation are not allowed to attempt to write to the same register in the same cycle because register scoreboard 103 has stalled the non-delayed operation.

FIG. 9 illustrates the three basic instruction formats employed by master processor 60. FIG. 9a illustrates the short immediate instruction format. This format allows a 15 bit immediate operand, one source register and a destination register to be specified. The 15 bit immediate value is considered to be signed for some instructions and unsigned for others. The bits in the OPCODE field (bits 21-15) define the operation of the instruction. FIG. 9b illustrates the three register instruction format. This format allows the specification of two source registers and one destination register. The bits in the OPCODE field (bits 19-13) define the operation of the instruction. The bits of the OPTIONS field (bits 11-5) are either ignored or specify options to the instruction. FIG. 9c illustrates the long immediate instruction format. This format allows all the options of the 3 register form and a 32-bit immediate constant. Note when a long immediate instruction is decoded, the execute stage of the pipeline stalls for at least one cycle to enable the immediate constant to be loaded. The fetch stage is modified to employ the 32 bit immediate constant as an operand rather than as an instruction. If the same operation can be specified in all forms the 7-bit OPCODE field of the instruction is the same in all three forms, with the register and long immediate forms having a "11" prefix.

Master processor 60 supports the IEEE Standard 754 floating point operation. Hardware support consists of a full double precision (64 bit) arithmetic logic unit and a single precision (32 bit) multiplier. The floating point hardware is pipelined and the multiplier is supported with microcode to give a high performance. A single precision multiply or a double precision add can be started in each cycle.

Floating point operands are read from the register file when the instruction is dispatched. Execution will typically take more than one cycle. The result is stored back into the register file when the instruction completes. Register scoreboard 103 synchronizes use of the results. The floating point unit has a dedicated write port to register file 102 to allow floating point instructions in parallel with the memory interface.

This is a brief description of the numbering system, a complete description is in the IEEE standard 754-1985. The number formats and types for the floating point unit 101 are single precision (32 bit) and double precision (64 bit).

A floating point number is made up of two parts: the mantissa and the exponent. The value of the number is then "mantissa x radix$^{exponent}$". The IEEE standard 754 uses a radix of two (binary), and a sign magnitude form for the mantissa. There are several number "categories" within each precision. Some categories represent ranges of numbers and others are abstract types.

Normal numbers are those numbers within the range of the given precision. The term normalized comes from the fact that the mantissa of a normalized number ranges from 1 to 2. This fact is used in several ways in the multiply and divide algorithms. Because the value is between 1 and 2 the most significant bit of the mantissa is always 1. This fact is used by not explicitly encoding the most significant bit, it is called the hidden bit HB or implied bit. When a number is written with the hidden bit not explicitly shown the number is said to be in a packed format. Conversely, if the hidden bit is explicitly shown the number is said to be in an unpacked format.

The IEEE standard 754 uses what is called a biased exponent. This is an exponent with a constant offset bias. The result of the exponent bias is that all exponents are positive numbers. The single precision bias is 127 and the double precision bias is 1023.

Denormal numbers fall between the minimum normal number and zero. They are identified in the packed format by an exponent of all zeroes and a non zero mantissa. In this case the hidden bit is a zero. The real value of the biased exponent is one, but the exponent is stored in the register file in packed format as a zero so that denormal numbers can be distinguished from normal numbers.

The infinity number is another type of floating point number with special features corresponding to the mathematical concept of infinity. It is defined as a number who's exponent is all ones and the packed mantissa equal to zero. It can have either sign. The hidden bit is zero.

The NaN (not-a-number) has no numerical value, but does have special meanings. There are two types of NaNs: signalling NaN (SNaN); and quiet NaN (QNaN). If an signaling NaN is used as an input operand to a floating point instruction, the invalid operation exception is signaled and a quiet NaN is returned. If a quiet NaN is used as an operand to a floating point instruction without a signaling NaN as the other operand, the invalid operation exception is not signalled and that quiet NaN is returned. If two quiet NaNs are used as operands to a floating point instruction then the source 1 quiet NaN will be returned. For mixed precision instructions including conversions of floating point numbers to another precision, the exact input quiet NaN can not be copied to the output. When the input quiet NaN is single precision and the output quiet NaN is double precision, the mantissa of the single precision quiet NaN will be 0 extended to fit the double precision. The sign will be copied. The double precision exponent will be all "1's". When the input quiet NaN is double precision and the output quiet NaN is single precision, the mantissa of the double precision quiet NaN will be truncated to the single precision. The sign will be copied. The single precision exponent will be all "1's". The output of all invalid operations is a quiet NaN and to simplify design it will always be the same quiet NaN. That quiet NaN will be all "1's".

The definition of what is an signaling NaN is not specified by the IEEE standard 754, but it does require that a system support both signalling and quiet NaNs. In general NaN's are defined as a number with all ones in the exponent and a non-zero mantissa. In master processor 60 the most significant bit of the packed mantissa to denotes the difference between a signaling NaN and a quiet NaN.

The sign of a NaN doesn't matter. The exponent of a NaN is all "1"'. The hidden bit of a NAN is "1". A signaling NaN has a packed most significant bit equal to "0" and a mantissa not equal to "0". A quiet NaN has a packed most significant bit of "1".

The wrapped format is used to represent numbers that have exceeded the exponent range for a particular format (single precision or double precision). For example, when a single precision denormalized number is normalized, the exponent will become too small (<Hex "01") for the standard single precision exponent to represent. The exponent underflow will then be represented in a wrapped format, meaning that the exponent has gone below a biased value of 1. The biased single precision exponent will first become the value "0" and then it will become negative (Hex "FF"). In the single precision wrapped format, a biased value of Hex "00" is equal to an unbiased value of −127 and a biased value of wrapped Hex "FF" is equal to an unbiased value of −128. The exponent wrapped around zero and started over from the maximum exponent (Hex "FF"). Also, numbers can become too large to represent and exponent overflow will wrap around the largest exponent (Hex "FF" in single precision) and start over with the smallest exponent (Hex "00"). Associated with that operand is a signal not visible to user which indicates to floating point unit 101 that the number has wrapped. Usually wrapped numbers will only be used internal to floating point unit 101.

The instruction set of master processor 60 allows for many permutations of operand types within a single instruction. A subset of most permutations of mixed precision operands is supported in floating point unit 101 for any single arithmetic instruction as shown in Table 1.

TABLE 1

| First Operand | Second Operand | Result |
| --- | --- | --- |
| SP | SP | SP |
| DP | DP | DP |
| I | I | I |
| U | U | U |
| SP | DP | DP |
| DP | SP | DP |
| SP | SP | SP |

In Table 1: SP means 32 bit single-precision floating point; DP means 64 bit double-precision floating point; I means 32 bit signed integer; and U means 32 bit unsigned integer.

In addition to mixed types in regular operations, conversions between types is useful. Conversion between types is done in floating point arithmetic logic unit 210. Table 2 shows the conversions. These include converting a signed or an unsigned integer to either single or double precision floating point format, converting it back, and converting between the two floating point precision.

TABLE 2

| Input Format | Output Format |
| --- | --- |
| SP | SP |
| SP | DP |
| SP | I |
| SP | U |

TABLE 2-continued

| Input Format | Output Format |
|---|---|
| DP | SP |
| DP | DP |
| DP | I |
| DP | U |
| I | SP |
| I | DP |
| U | SP |
| U | DP |

Figures 10, 11, 12:
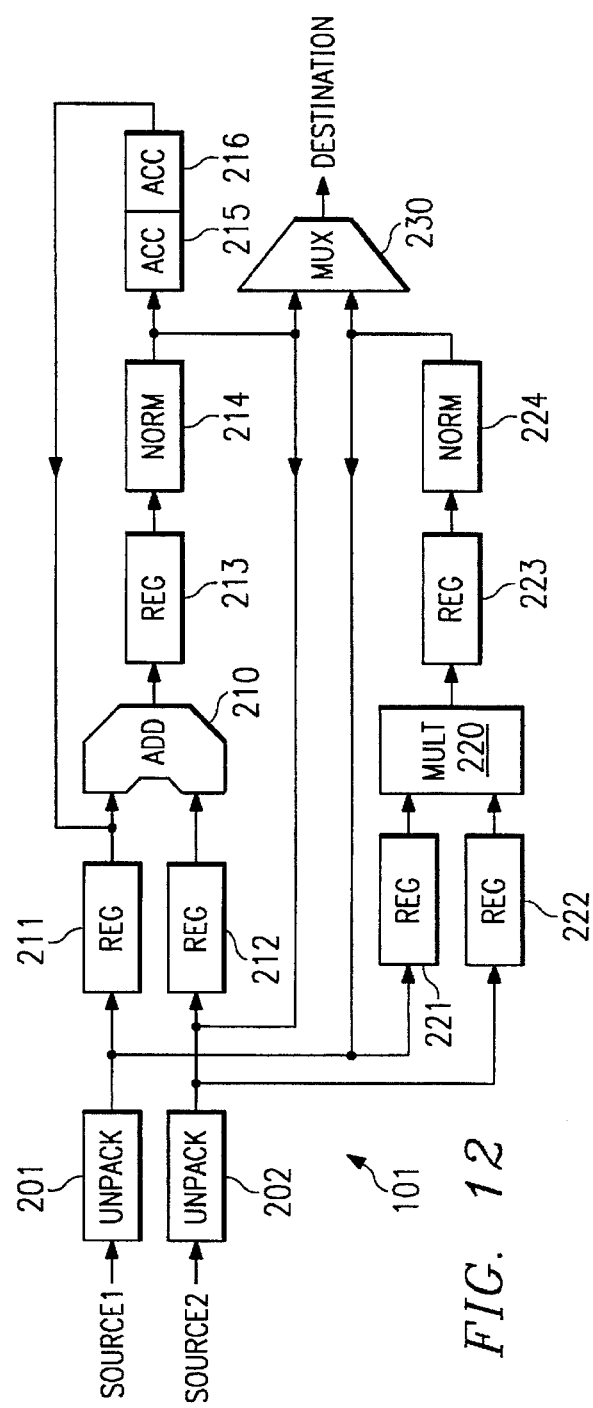
FIG. 10 illustrates the floating point pipeline operation of the master processor.
FIG. 11 illustrates the encoding of the floating point status register of the master processor.
FIG. 12 illustrates the architecture of the floating point unit of the master processor.

FIG. 10 shows the basic pipeline for floating point unit 101. The fetch stage is the same as the fetch stage of integer operations previously described. During the unpack stage of a floating point instruction, all data necessary to begin the floating point operation arrives including source operands, opcode, precision and destination address. The two source operands are read from the register file. Operands are then unpacked into sign, exponent, mantissa fields and the detection of special cases takes place. Input exceptions are detected in this cycle. And input exceptions will be piped through floating point unit 101 and will be signaled on the same cycle as a single precision output exception. The other special cases involving signaling NaN, quiet NaN, infinity, denormal, and zero, are also detected and this information, which is not visible to user, will follow the data through the different pipeline stages of floating point unit 101.

All computation takes place during the operate stage. Depending on the type of instruction, several cycles in the operate stage may be required.

Output exceptions are detected in the final normalize stage. When floating point unit 101 result is determined, some of the individual information about this floating point operation is recorded in floating point status register FPST 118 as shown in FIG. 11. In FIG. 11, the Dest field (bits 31-27 form the five-bit destination register address. The ai bit (bit 26) is the accumulated invalid operation flag. The az bit (bit 25) is the accumulated divide by zero flag. The ao bit (bit 24) is the accumulated overflow flag. The au bit (bit 23) is the accumulated underflow flag. The ax bit (bit 22) accumulated inexact flag. The sm bit (bit 21) indicates the floating point unit is run in sequential mode where operation stalls waiting for completion of the first floating point operation. The fs bit (bit 20) indicates floating point unit 101 is stalled. The vm bit (bit 19) indicates a vector fast exception mode. The drm field (bits 18-17) is the default rounding mode (if not specified by instruction) as: "00" used to round to nearest integer; "01" used to round to zero; "10" used to round toward positive infinity; and "11" used to round toward negative infinity. The opcode field (bits 16-13) stores the four-bits of the last instruction's opcode. The e1 bit (bit 12) is the tenth most significant bit of an 11-bit exponent. The e0 bit (bit 11) is the ninth most significant bit of an 11-bit exponent. The pd field (bits 10-9) is two-bit destination precision code: "00" single precision floating point; "01" double precision floating point; "10" signed integer; and "11" unsigned integer. The rm field (bits 8-7) it the two-bit rounding mode of the last instruction to write into floating point status register FPST 118. The mo bit (bit 5) is the integer multiply overflow flag. The i bit (bit 4) is the invalid flag. The z bit (bit 3) is the finite number is divided by zero flag. The o bit (bit 2) is the overflow flag. The u bit (bit 1) is the underflow flag. The x bit (bit 0) is the inexact flag. Bits i, z, o, u and x are written at the completion of each individual floating point instruction. The floating point operation is considered to be complete when this status information is written into floating point status register FPST 118. Any floating point instruction writes to floating point status register FPST 118 once and only once.

FIG. 12 illustrates the construction of floating point unit 101. A pair of unpack units 201 and 202 unpack the received data from the first and second sources. Floating point unit 101 includes two independent units, floating point adder 210 and floating point multiplier 220. The floating point adder 210 unit handles adds, subtracts and conversions. The floating point multiplier 220 unit does all integer multiplies, floating point multiplies, divides, and square roots. The two units are independent in the sense that if floating point multiplier 220 unit is busy, then floating point adder 210 operation can begin. Floating point multiplier 220 unit uses floating point adder 210 unit for special cases such as denormal handling as discussed below. Each has a set of temporary input registers, 211 and 212 for floating point adder 210, and 221 and 222 for floating point multiplier 220. Each has an output register 213 and 214 and a normalization unit 214 and 224. Floating point adder 210 also drives a quadruple word accumulator including registers 215 and 216. Multiplexer 230 selects the signal supplied to the destination.

Figure 13:
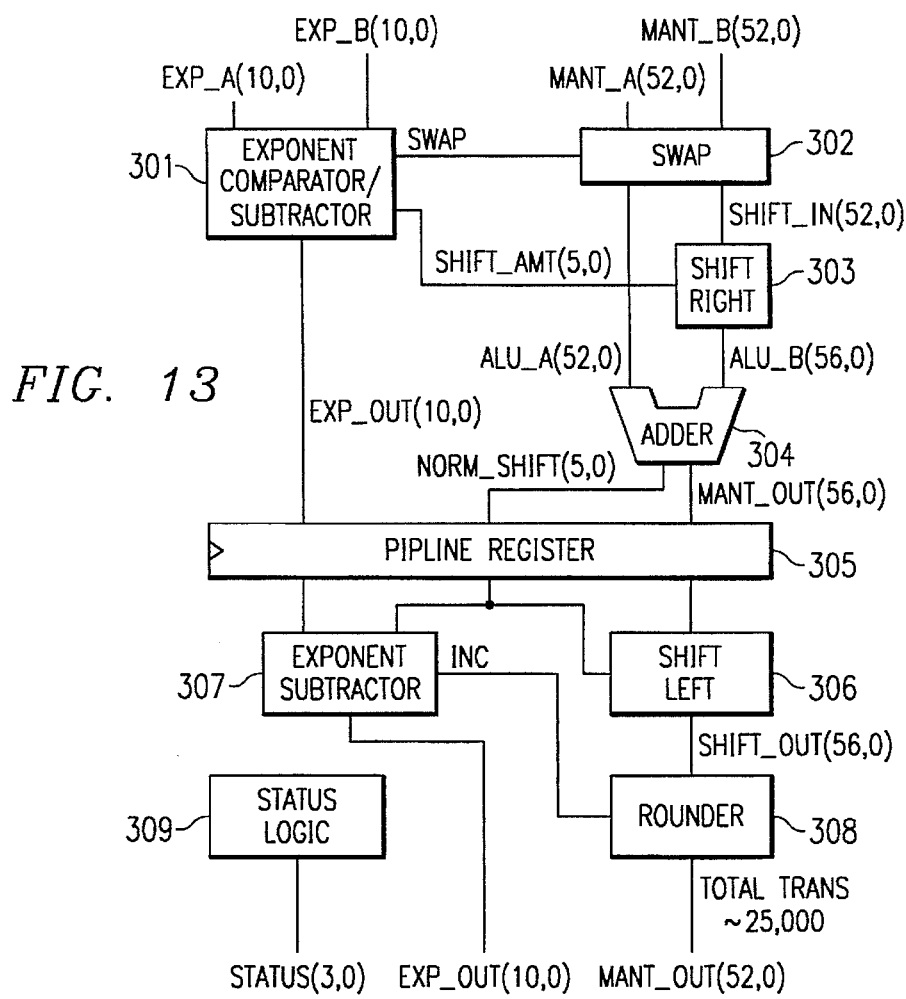
FIG. 13 illustrates the architecture of the floating point arithmetic logic unit of the master processor.

Floating point adder unit 210 is a full 64 bit double precision floating point add unit. Construction of floating point adder unit 210 is illustrated in FIG. 13. A double precision operation can be started on every cycle and has the same latency as single precision. The floating point adder 210 unit has the following stages. Exponent comparator/subtractor 301 compares exponents and shift smaller number right to align binary point. Swap unit 302 optionally swaps the first and second operands before supply to adder 304. Shift right unit 303 receives a signal from exponent comparator/subtractor 301 and makes a corresponding right shift in the second operand. Note that swap unit 302 insures that alignment can be achieved by a right shift. The first step in adding or subtracting two binary numbers is to align the mantissa binary points. If exponent comparator/subtractor 301 determines the first operand has the smaller exponent, the two operands are swapped in swap unit 302. The net amount of right shift in the optionally swapped second operand, which now has the smaller exponent, is the absolute difference between the exponents of the first and second operands. Shift right unit 303 makes this shift in the amount determined by exponent comparator/subtractor 301. The two operands are then fed into standard full adder 304. Full adder 304 predicts the location of the leading 1 in the mantissa which is used in the normalize step.

Exponent comparator/subtractor 301 employs a structure to make an early exponent comparison. Note that the two input floating point numbers may be swapped in swap unit 302 depending on the relative size of the two input floating point numbers. Since this swap determination needs to be made before floating point adder unit 210 can proceed, it would be helpful if a comparison can be determined to select to swap or not to swap before the difference in exponents is available for use by shift right unit 303. Thus it is advantageous to employ extra hardware in exponent comparator/subtractor 301 to make the swap determination early.

Figure 14:
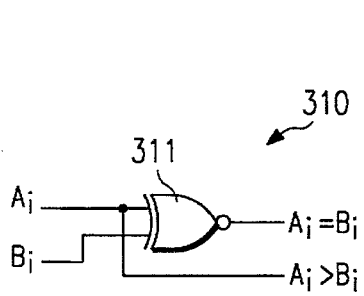
FIG. 14 illustrates a 1 bit group compare circuit.

The comparator used in exponent comparator/subtractor 301 employs a technique permitting assembly of data comparators of any size. Smaller comparators are recursively combined to form larger comparators. FIG. 14 illustrates a single bit comparator circuit 310 used to compare respective bits $A_i$ and $B_i$. This single bit comparator circuit 320 generates two outputs A=B and A>B. Exclusive NOR gate 311 receives the respective inputs A[i] and B[i] and forms the A=B output. The A>B output comes directly from the A[i] input. As previously stated, a single bit comparator circuit 310 is provided for each bit to be compared. Thus single bit comparator circuit 310 preforms the following functions:

$$\{A=B\} = A \text{ XNOR } B$$

$$\{A>B\} = A$$

where: A and B are the inputs to single bit comparator circuit 310; and {A=B} and {A>B} are the outputs from single bit comparator circuit 310.

Figure 15:
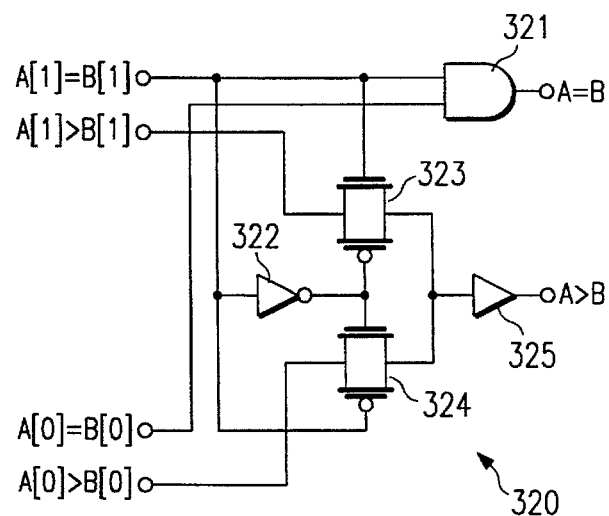
FIG. 15 illustrates a two bit compare circuit.

FIG. 15 illustrates a two bit comparator circuit 320. A circuit 320 is provided for each pair of bits within the set of bits to be compared. There are four inputs to two bit comparator circuit 320, A[0]>B[0], A[0]=B[0], A[1]>B[1] and A[1]=B[1]. These inputs are received from prior comparator circuits. For a first layer of two bit comparator circuits 320, these input come from a pair of single bit comparator circuits 310. For further layers, these inputs come from prior two bit comparator circuits 320. Each two bit comparator circuit 320 produces two outputs, A=B and A>B. AND gate 321 receives the A[0]=B[0] and A[1]=B[1] inputs and generates the A=B output. Thus for each two bit comparator circuit 320 the A=B output is "1" only if both the A[0]=B[0] and A[1]=B[1] are "1". If both these inputs indicate equality then the output equality must be true. If the A[1]=B[1] input term is "0", then this signal and its inverse from invertor 322 turns on pass gate 323. This couples the A[1]>B[1] input term to the output A>B via buffer 325. If the A[1]=B[1] input term is "1", then this signal and its inverse from invertor 322 turns on pass gate 323, which couples the A[0]>B[0] input to the output A>B via buffer 325. Two bit comparator circuit 320 generates the A>B term by transferring the value of A[n] from the most significant bit position where A[n] and B[n] are different. The signal A>B is "1" if this A[n] is "1" and the signal A>B is "0" if this A[n] is "0". Thus two bit comparator circuit 320 performs the following Boolean logic functions:

$$\{A = B\} = \{A[1] = B[1]\} \text{ AND } \{A[0] = B[0]\}$$

$$\{A > B\} = (\text{NOT}\{A[1] = B[1]\} \text{ AND } \{A[1] > B[1]\}) \text{ OR } (\{A[1] = B[1]\} \text{ AND } \{A[0] > B[0]\})$$

where: {A[0]>B[0]}, {A[0]=B[0]}, {A[1]>B[1]} and {A[1]=B[1]} are the inputs to two bit comparator circuit 320; and {A=B} and {A>B} are the outputs from two bit comparator circuit 320.

Figure 16:
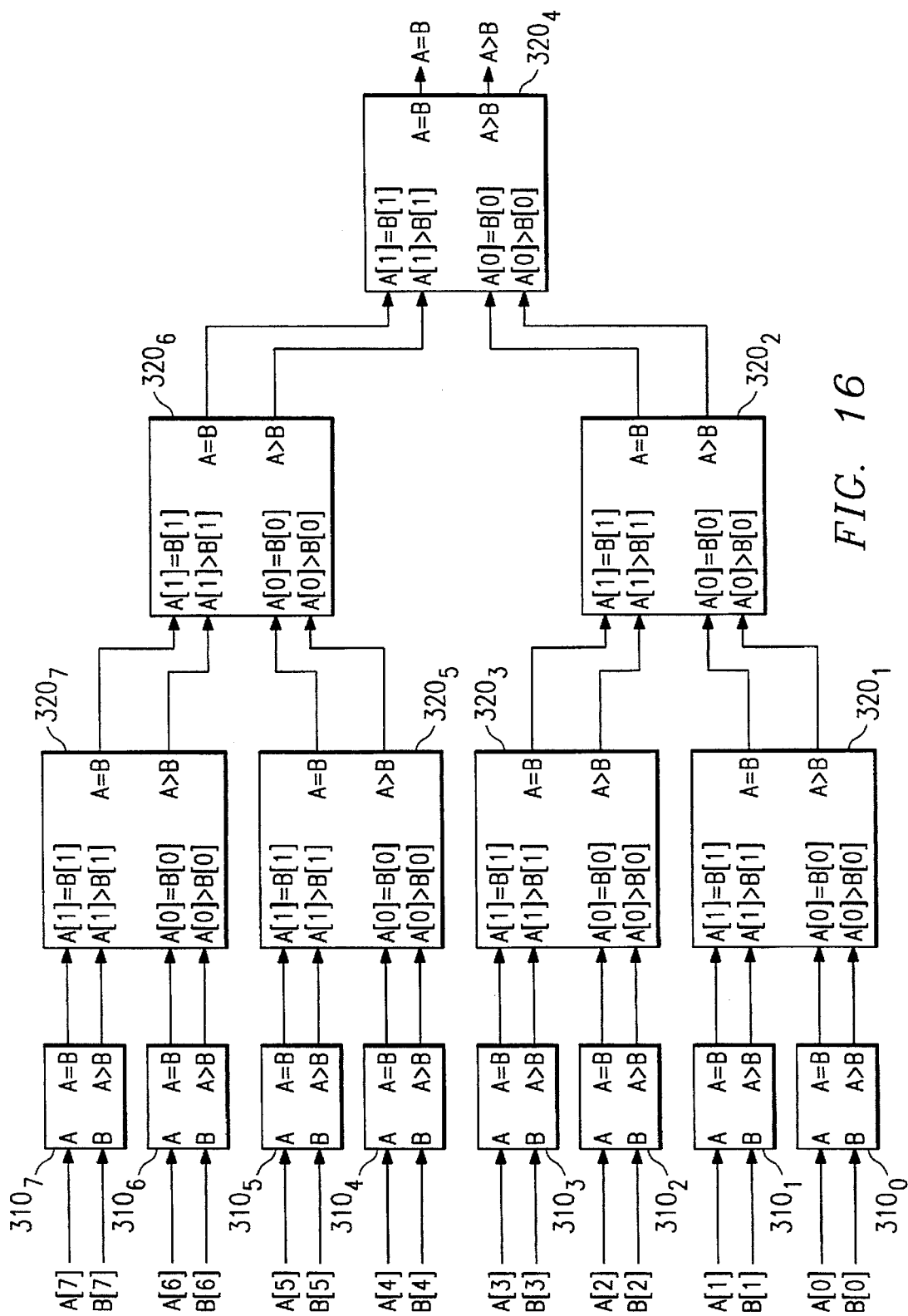
FIG. 16 illustrates an 8 bit exponent compare block diagram.

Large comparators are formed by combining the two types of smaller comparators. FIG. 16 illustrates in block diagram form an 8 bit comparator suitable for comparing two single precision floating point exponents. Eight single bit comparators $310_0$ to $310_7$ receive the corresponding bits of the A and B signal. Four two bit comparators $320_1$, $320_3$, $320_5$ and $320_7$ receive the outputs of single bit comparators $310_0$ and $310_1$, $310_2$ and $310_3$, $310_4$ and $310_5$, and $310_6$ and $310_7$, respectively. Two bit comparator $320_2$ receives the outputs of two bit comparators $320_1$ and $320_3$. Two bit comparator $320_6$ receives the outputs of two bit comparators $320_5$ and $320_7$. Lastly, two bit comparator $320_4$ receives the outputs of two bit comparators $320_2$ and $320_6$. Two bit comparator $320_4$ produces the comparison output.

The 8 bit magnitude comparator takes two 8 bit input operands and indicates either which is larger, or if they are the same. It has 2 outputs, A>B and A=B. This implementation relies on the equality term being dominant. If A=B is true, then the A>B output is ignored and can have any value. Only if A and B are not equal does the A>B output have any significance. Note that if A=B, then swap unit 302 does not need to swap the mantissas, because the exponents are equal and no shifting is required. If A=B is false, then the A>B term determines if a swap is required. If A>B is true, then no swap is required because a right shift of the second operand can align the binary points. If A>B is false, then the swap signal is sent to swap unit 302. Thus a swap is required if NOT{A=B} AND NOT{A>B}. Note that exponent comparator/subtractor 301 still needs additional circuits to determine the difference between the exponents to produce the shift amount signal SHIFT_AMT supplied to shift right unit 303. These additional circuits are conventional and will not be further described.

Figure 17:
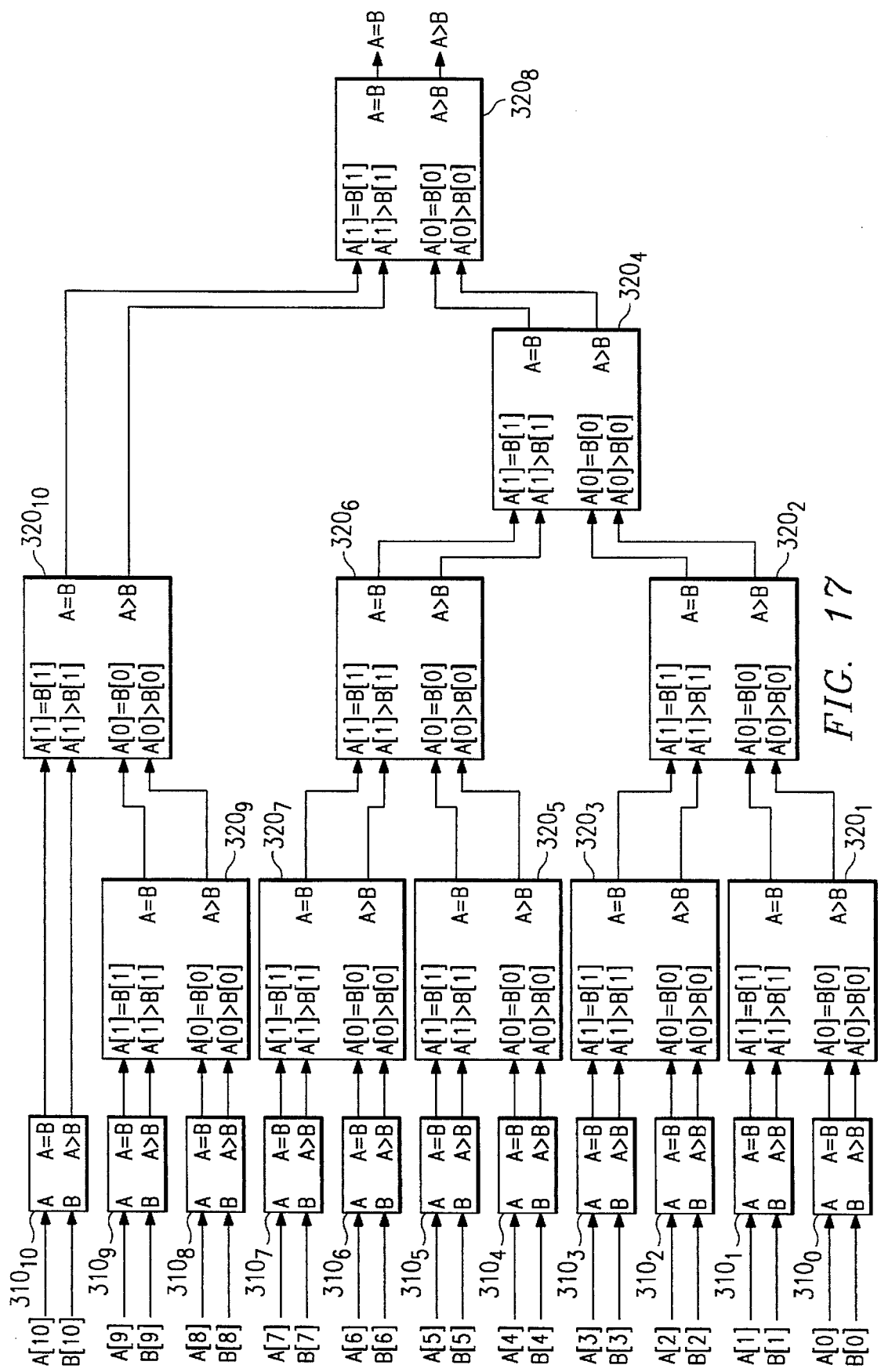
FIG. 17 illustrates an 11 bit exponent compare block diagram.

FIG. 17 illustrates, in block diagram form, an 11 bit comparator suitable for comparing two double precision floating point exponents. Eleven single bit comparators $310_0$ to $310_{10}$ receive the corresponding bits of the A and B signal. Five two bit comparators $320_1$, $320_3$, $320_5$, $320_7$ and $320_9$ receive the outputs of single bit comparators $310_0$ and $310_1$, $310_2$ and $310_3$, $310_4$ and $310_5$, $310_6$ and $310_7$, and $320_8$ and $320_9$, respectively. Two bit comparator $320_2$ receives the outputs of two bit comparators $320_1$ and $320_3$. Two bit comparator $320_6$ receives the outputs of two bit comparators $320_5$ and $320_7$. Two bit comparator $320_{10}$ receives the output of two bit comparator $320_9$ and the output of single bit comparator $310_{10}$. Two bit comparator $320_4$ receives the outputs of two bit comparators $320_2$ and $320_6$. Two bit comparator $320_8$ receives the outputs of two bit comparators $320_4$ and $320_{10}$. Two bit comparator $320_{10}$ produces the comparison output. This circuit operates on the same principles as the eight bit comparator circuit illustrated in FIG. 16. This also shows that this technique works for data sizes other than powers of 2.

Figure 18:
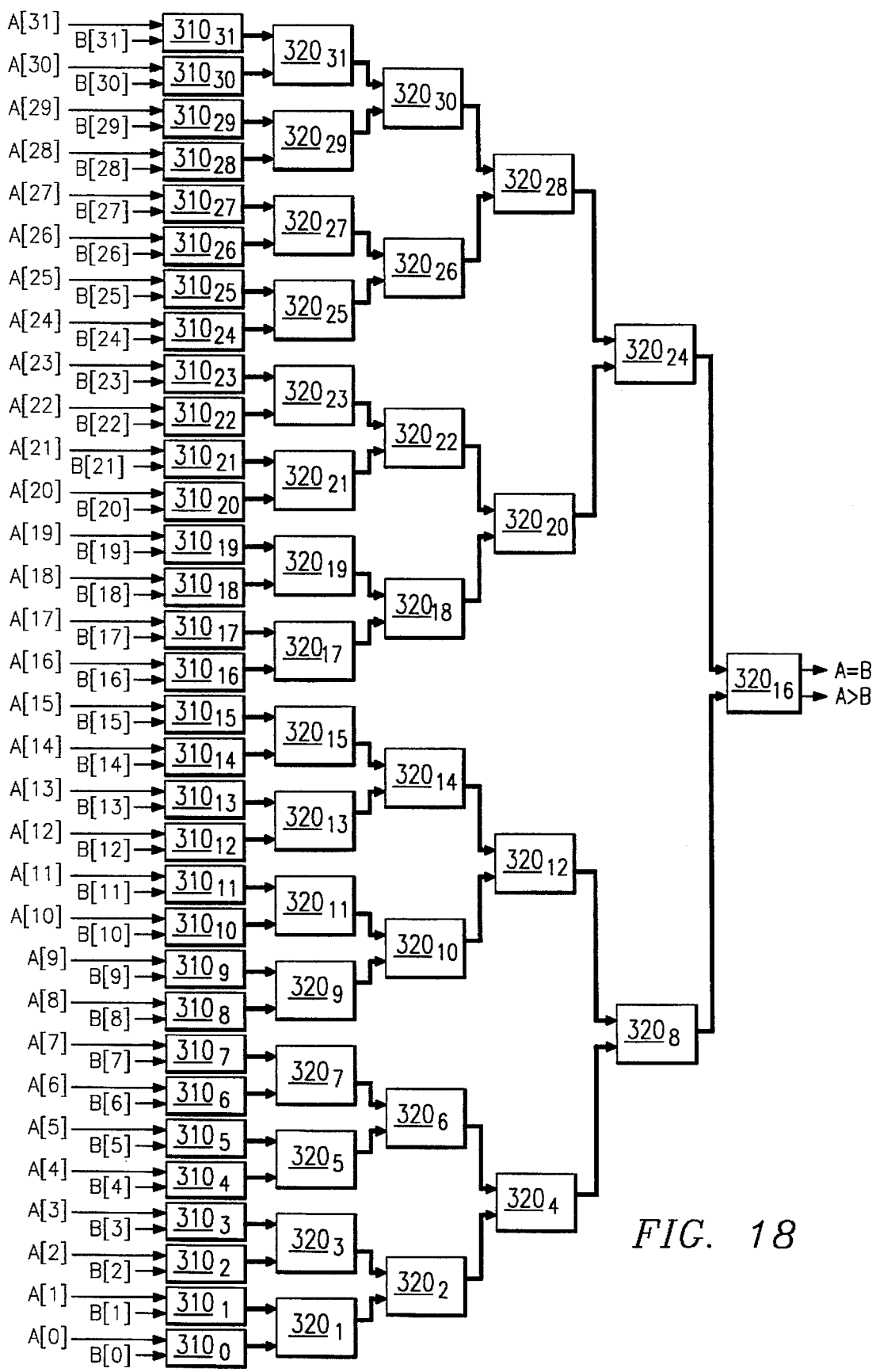
FIG. 18 illustrates a 32 bit compare block diagram.

This technique can be used to construct larger comparator circuits. FIG. 18 illustrates a part of a 32 bit comparator circuit. There are 32 single bit comparator circuits $310_0$ to $310_{31}$ receiving corresponding bits of the two inputs. There are 31 two bit comparator circuits $320_1$ to $320_{32}$. In FIG. 18 it might appear that the 32 two bit comparator circuits $320_1$ to $320_{32}$ require 5 separate rows within the data path. In fact only a single row is necessary. The numbers of the two bit comparator circuits $320_1$ to $320_{32}$ shown in FIG. 18 indicate the bit position within in single row chosen for each instance. Regardless of the size of the data words, the magnitude comparator requires N–1 two bit comparator circuits 320 for an N bit comparison.

The IEEE standard 754 requires that all operations be done as if using infinite precision and then rounding to the destination format. To conform to the IEEE standard 754 the shift right unit 303 adds 3 bits to the least significant end of the mantissa. The first two are normal extra bits of precision. The third bit is the logical OR of all the bits shifted off the end of the mantissa during the right shift operation. The results of exponent comparator/subtractor 301 and adder 304 are supplied to pipeline register 305, which temporarily stores these results. This permits the addition operation to be overlapped or pipelined with the normalization operation.

After completion of the add/subtract the mantissa is now 3 bits longer than when it started and the hidden bit may not be a "1". This can happen if the two mantissas were subtracted, or the addition of two numbers with opposite signs. The definition of a normalized number requires the hidden bit to be a "1". The floating point adder 210 unit normalizes the mantissa. Shift left unit 306 left shifts the mantissa until the hidden bit is a "1". The number of shifts required to normalize the mantissa is generated by full adder 304 in the previous stage. If the mantissa is shifted left, then exponent subtractor 307 decrements the exponent reflecting the new mantissa by subtracting the shift count from the exponent. This is satisfactory if the exponent does not go below the minimum exponent value, which is a biased value of 1. If the exponent does go below it's minimum value, the number becomes denormalized. The left shift is only allowed until the exponent is 1 or the shift has completed. The number coming out of the shift left unit 306 has now been normalized as much as possible and is ready to be rounded into the destination precision.

The rounder 308 uses the three extended bits of precision along with the mantissa least significant bit, sign, and the rounding mode. The rounding modes are defined by the IEEE standard 754 standard and are selected by the user. The four rounding modes are defined above in conjunction with the description of the floating point status register FPST 118. The round to nearest (half adjust) and the round to zero (truncate) are the most common rounding modes. The directed rounding modes are normally used to control round off error in a known manner. The round to zero mode is simple; the input mantissa is truncated to the destination precision. The round to nearest mode can be stated as being round to nearest, or to even if exactly halfway. In the round to nearest mode, the mantissa is incremented if the following equation is true:

$$\text{round\_up} = \text{1st-bit AND (2nd-bit OR 3rd-bit OR lsb)}$$

There is a problem using a single rounder 308 for both single precision and double precision. Since the number of bits in these two formats differs, the bits needed to make the rounding determination appear at different locations. For this reason it is difficult to employ a single rounder unit for the two formats. The IEEE standard 754 double precision floating point format includes 53 bits of mantissa while the IEEE standard 754 single precision floating point format includes 24 bits of mantissa. It would be useful to employ the same basic rounding hardware for both single precision and double precision operations. It would seem logical to do this because the method for rounding is identical for both single and double precision numbers.

Figures 19, 20, 21:
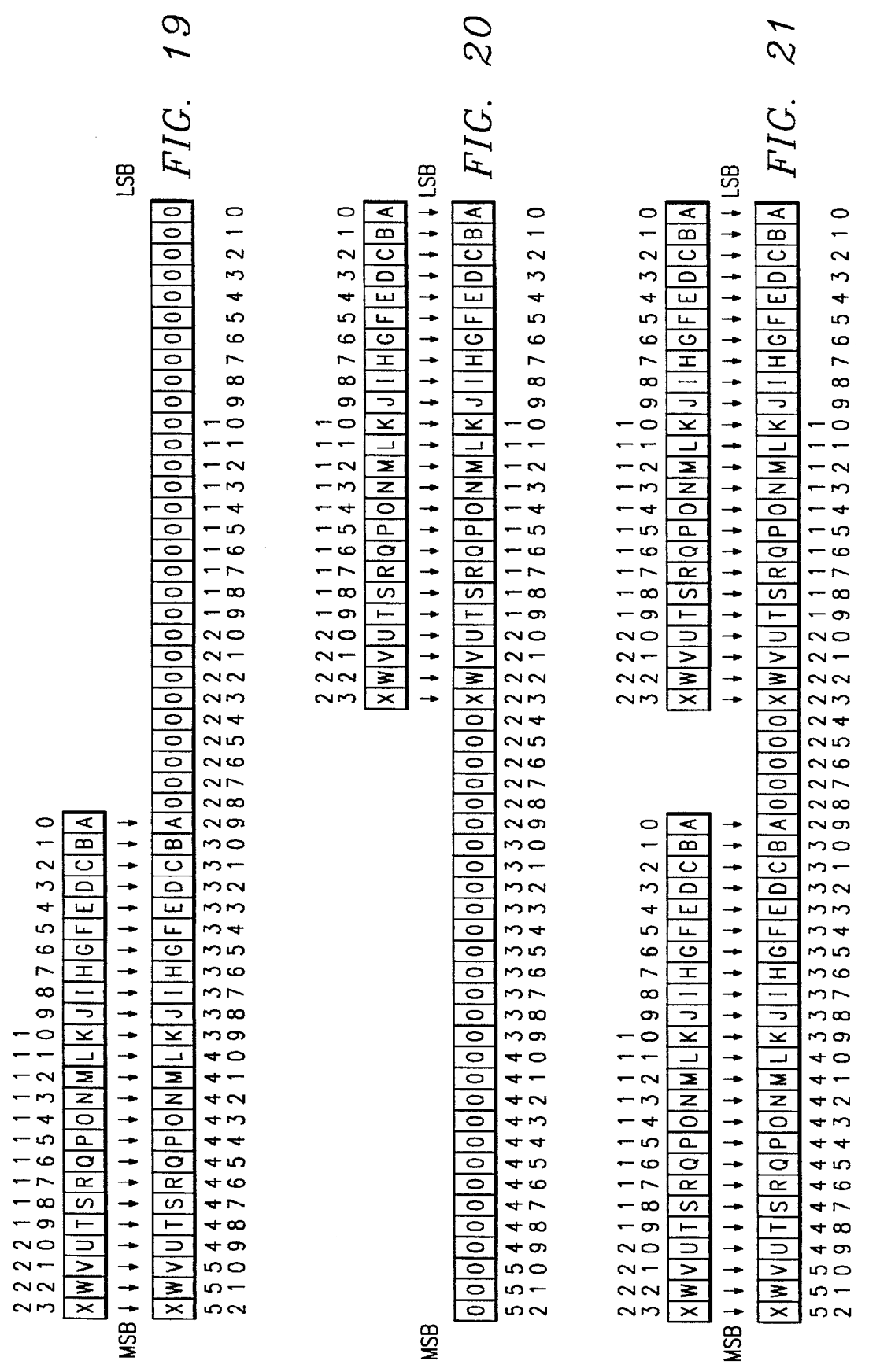

Previous attempts to employ the same rounding unit for both single precision and double precision floating point numbers used one of two techniques. In one technique, the 24 mantissa bits of the single precision floating point number were left justified within a 53 bit window used by double precision floating point numbers. This is illustrated in FIG. 19. The 24 bits of the mantissa of the single precision floating point number are labeled A to X from the least significant to the most significant. These bits are supplied to bits 29 to 52 of the double precision data path as shown in FIG. 19. Bits 0 to 28 of the double precision data path are filled with "0's."

This technique places the least significant bits of the single precision floating point number, the bits which carry the information needed for rounding, in the center of the double precision data path. Extra circuitry beyond what is used for double precision rounding is needed to round in single precision mode. Alternatively, extra circuitry is needed to shift the least significant bits of the single precision mantissa to the least significant locations of the double precision data path.

In the second technique, illustrated in FIG. 20, the 24 bits of the single precision mantissa are right justified within the 53 bit double precision data path. Bits A to X of the single precision mantissa are supplied to bits 0 to 23 of the double precision data path. Bits 24 to 52 of the double precision data path are filled with "0's." This simplifies the rounding required because the least significant bits which control rounding are in the same locations for both single precision mode and double precision mode. A different problem occurs using this technique. Subsequent normalization of the single precision floating point number may require multiple left shifts of the data. As noted above, the mantissa must be left shifted until the hidden bit is "1." The information required to determine the amount of this left shift is contained in the most significant bits of the mantissa. Since the most significant part of the single precision mantissa is not in the same location as the most significant part of the double precision mantissa, more circuitry is necessary to cover the single precision mode. In addition, the shift needed for the single precision mode will often take more time than the longest shift needed in the double precision mode. Thus neither of these techniques is without disadvantages.

In accordance with the present invention, the single precision mantissa is both left and right justified in the double precision data path. This is illustrated in FIG. 21. The bits A to X of the single precision mantissa appear at both bits 0 to 23 and bits 29 to 53. Bits 24 to 28 are filled with "0's." This left and right justification has two advantages. The least significant bits of the single precision mantissa are located in the same location as the least significant bits of the double precision mantissa. Thus the same hardware can easily be used for rounding in both modes. The most significant bits of the single precision mantissa are also located in the same location as the most significant bits of the double precision mantissa. Thus the determination of the required left shift needed for normalization occurs from the same base. This simplifies the normalization process in single precision mode. Note that the five "0's" at bits 25 to 28 serve as a buffer so that the two parts of the single precision mantissa do not corrupt each other. Because this buffer separates the two parts of the single precision mantissa, the same hardware can be used for single and double precision rounding.

Figure 22:
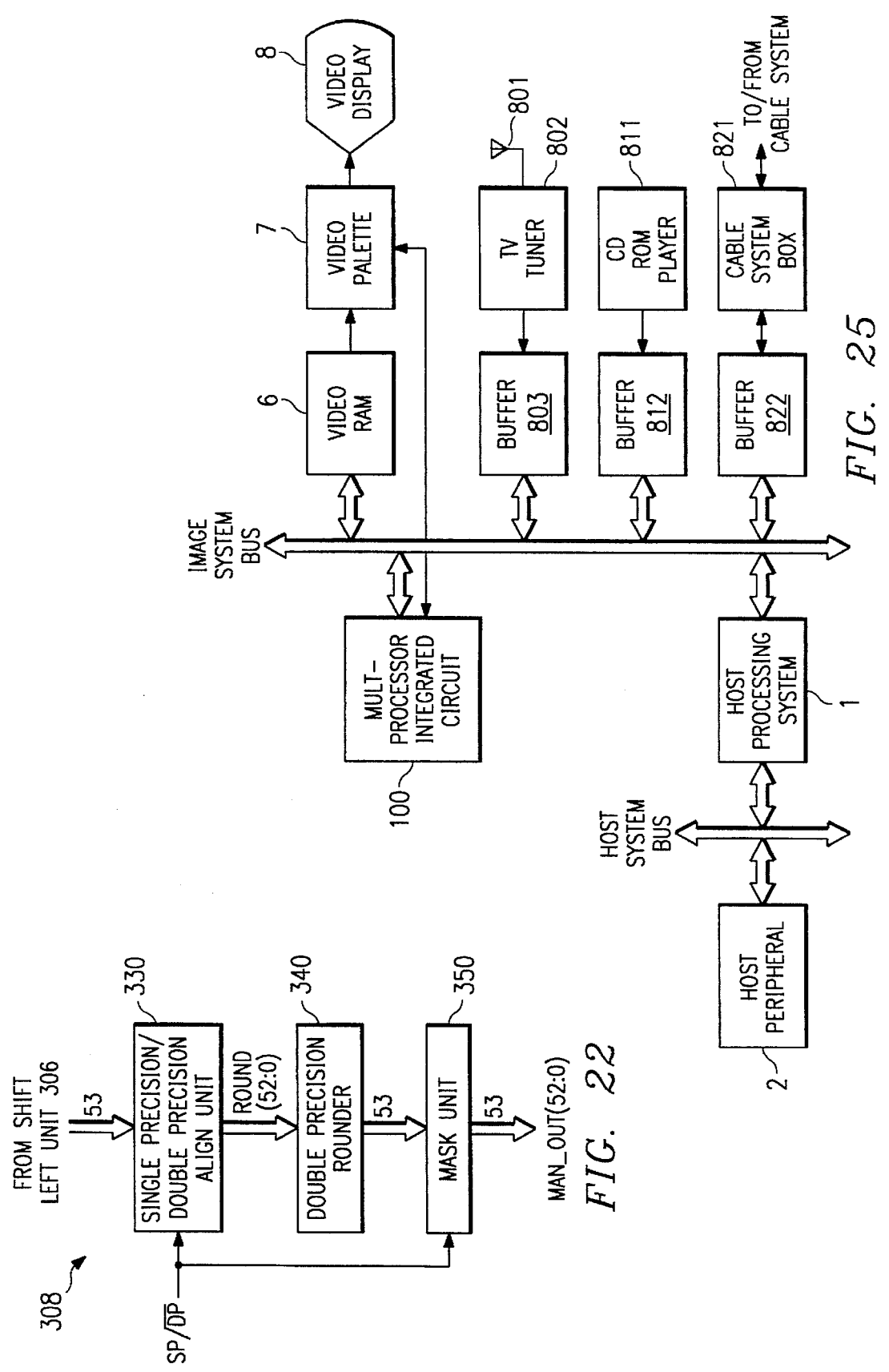
FIG. 22 illustrates details of the construction of the single precision/double precision alignment unit circuit illustrated in FIG. 19.

FIG. 22 is a block diagram of a rounder unit 308 constructed in accordance with this invention. Rounder 308 illustrated in FIG. 22 includes single precision/double precision align unit 330, double precision rounder 340 and mask unit 350. Single precision/double precision align unit 330 selectively left and right justifies the single precision mantissa into the 53 bits of the double precision data path as illustrated in FIG. 21. The signal SP/$\overline{\text{DP}}$ indicates whether floating point adder 210 is in single precision mode or double precision mode. If SP/$\overline{\text{DP}}$ is "1", then floating point adder 210 is in single precision mode. If SP/$\overline{\text{DP}}$ is "0", then floating point adder 210 is in double precision mode. When in double precision mode, single precision/double precision align unit 330 passes bits 0 to 52 of the input bus directly to corresponding bits 0 to 52 of an output bus designated Round(52,0). When in single precision mode, single precision/double precision align unit left and right justifies bits 0 to 22 of the input bus as illustrated in FIG. 21.

Figure 23:
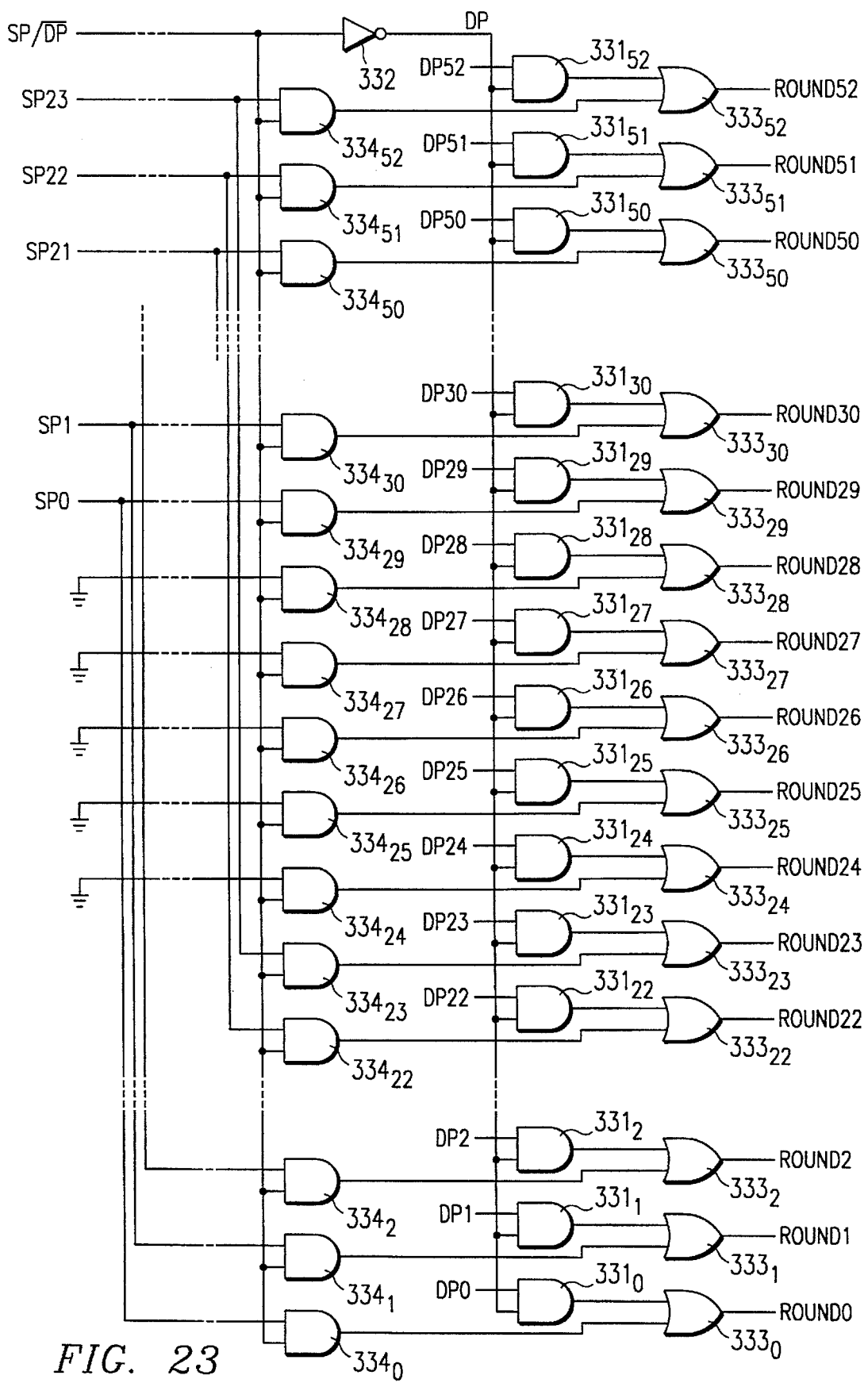
FIG. 23 illustrates details of the construction of the single precision/double precision rounder block diagram illustrated in FIG. 19.

FIG. 23 illustrates an exemplary embodiment of single precision/double precision align unit 308. Fifty three double precision input signals DP0 to DP52 are coupled to a first input of a set of AND gates $331_0$ to $331_{52}$. Each of these AND gates $331_0$ to $331_{52}$ receives at a second input a double precision mode signal formed by inverting the SP/$\overline{\text{DP}}$ using invertor 332. When in double precision mode, SP/$\overline{\text{DP}}$ is "0" and thus invertor 332 supplies a "1" to the second input of each AND gate $331_0$ to $331_{52}$. This enables each AND gate $331_0$ to $331_{52}$ to output a signal identical to its first input signal. Each AND gate $331_0$ to $331_{52}$ has its output connected to a first input of a corresponding OR gate $333_0$ to $333_{52}$. As will be further explained below, only one of the inputs to OR gates $333_0$ to $333_{52}$ is active at any time. Thus OR gates $333_0$ to $333_{52}$ pass the input signals from the corresponding AND gate $331_0$ to $331_{52}$ unchanged. The output of the OR gates $333_0$ to $333_{52}$ form fifty three signals ROUND0 to ROUND52. This causes single precision/double precision align unit 330 to output the input double precision input signals DP0 to DP52. This supplies the double precision input signals DP0 to DP52 to double precision rounder 340 unchanged.

Single precision/double precision align unit 330 operates differently if the single precision mode is selected. The signal SP/$\overline{\text{DP}}$ is directly coupled to one input of a set of AND gates $334_0$ to $334_{52}$. The output of each AND gate $334_0$ to $334_{52}$ supplies the second input of a corresponding OR gate $333_0$ to $333_{52}$. These AND gates $334_0$ to $334_{52}$ are enabled when the apparatus is in single precision mode and SP/$\overline{\text{D}}$$\overline{\text{P}}$ is "1". The other inputs of AND gates $334_0$ to $334_{52}$ are coupled to receive the single precision input signals SP0 to SP23. In accordance with this invention, the single precision input signals SP0 to SP23 are both left and right justified in the outputs ROUND0 to ROUND 52. As shown in FIG. 23, the most significant single precision input signal SP23 is connected to both the AND gate $334_{52}$ supplying the OR gate $333_{52}$ outputting ROUND52 and the AND gate $334_{23}$ supplying the OR gate $333_{23}$ outputting ROUND23. Likewise, the single precision input signal SP22 supplies both the pair AND gate $334_{51}$ and OR gate $333_{51}$ for ROUND51 and the pair AND gate $334_{22}$ and OR gate $333_{22}$ for ROUND22. Single precision input signal SP1 supplies the input to both AND gates $334_{30}$ and $334_1$ when in single precision mode. Lastly, single precision input signal SP0 supplied the input to both AND gates $334_{29}$ and $334_0$ when in single precision mode. Note that the second inputs for AND gates $334_{24}$ to $334_{28}$ corresponding to ROUND24, ROUND25, ROUND26, ROUND27 and ROUND28 are connected to ground. Thus AND gates $334_{24}$ to $334_{28}$ pass a "0" for these bits when in single precision mode.

Note that AND gates $331_0$ to $331_{52}$ and AND gates $334_0$ to $334_{52}$ are supplied opposite mode signals because of invertor 332. This means that either AND gates $331_0$ to $331_{52}$ are active and AND gates $334_0$ to $334_{52}$ are turned off or that AND gates $331_0$ to $331_{52}$ are turned off and AND gates $334_0$ to $334_{52}$ are active. Thus single precision/double precision align unit 330 outputs either the whole of the double precision input signals DP0 to DP52 unchanged or the single precision input signals SP0 to SP23 left and right justified according to this invention.

Figure 24:
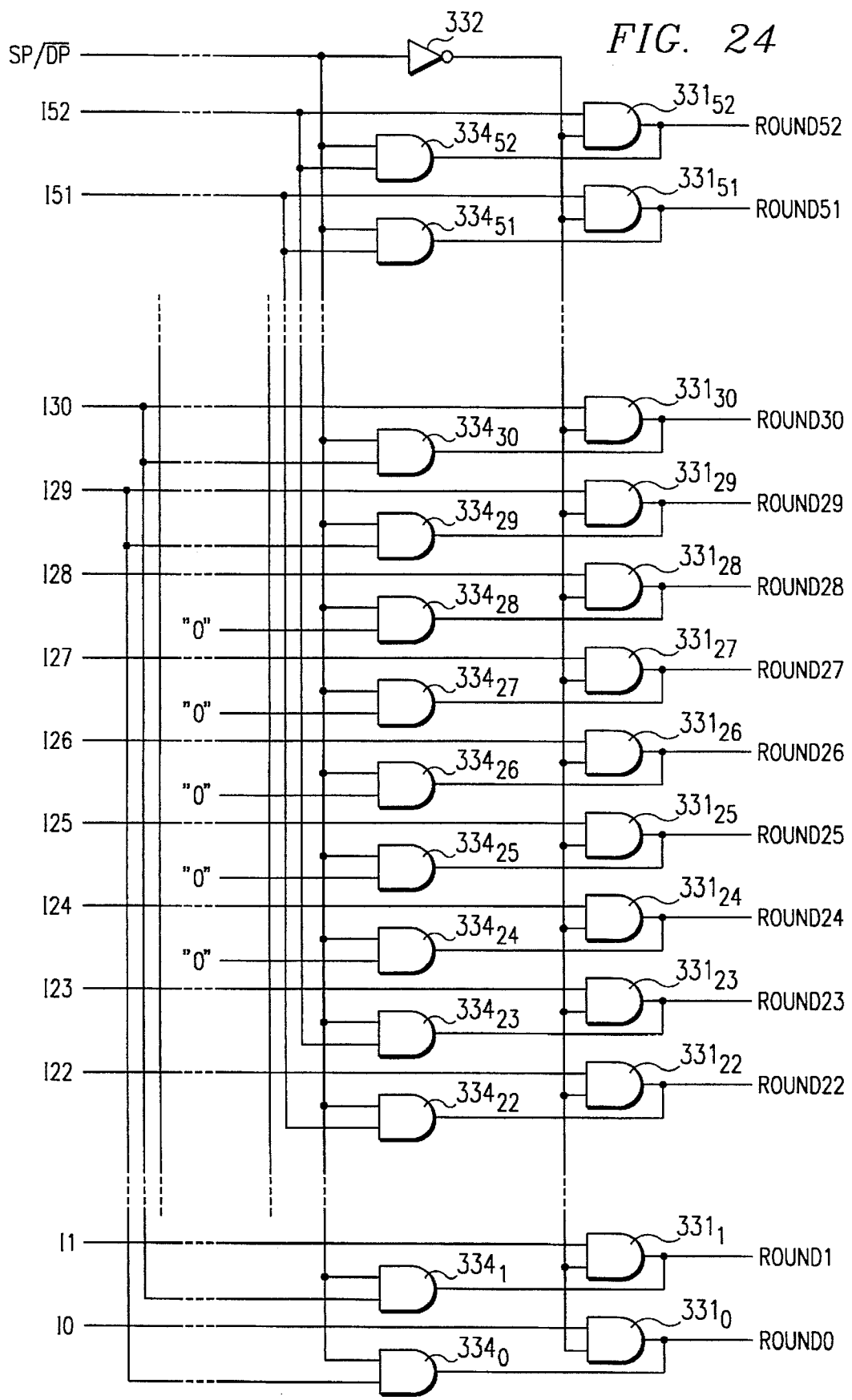
FIG. 24 illustrates details of an alternative construction of the single precision/double precision rounder block diagram illustrated in FIG. 19 in which the single and double precision inputs share a common bus.

FIG. 24 illustrates an alternative embodiment of single precision/double precision align unit 308. In this alternative embodiment, the single precision mantissa occupies the most significant bits of the double precision mantissa bus. Fifty three input signals I0 to I52 are coupled to a first input of a set of AND gates $331_0$ to $331_{52}$. Each of these AND gates $331_0$ to $331_{52}$ receives at a second input a double precision mode signal formed by inverting the SP/$\overline{\text{DP}}$ using invertor 332 as previously illustrated in FIG. 23. Each AND gate $331_0$ to $331_{52}$ has its output connected to a corresponding output ROUND0 to ROUND52. The signal SP/$\overline{\text{DP}}$ is directly coupled to one input of a set of AND gates $334_0$ to $334_{52}$. These AND gates $334_0$ to $334_{52}$ are enabled when the apparatus is in single precision mode and SP/$\overline{\text{DP}}$ is "1". The other inputs of AND gates $334_0$ to $334_{52}$ are coupled to receive the input signals I28 to I52. As shown in FIG. 24, the most significant input signal I52 is connected to both the AND gate $334_{52}$ outputting to ROUND52 and the AND gate $334_{23}$ outputting to ROUND23. Likewise, the input signal I51 supplies both the AND gate $334_{51}$ for ROUND51 and AND gate $334_{22}$ for ROUND22. Input signal I30 supplies the input to both AND gates $334_{30}$ and $334_1$. Lastly, input signal I29 supplies the input to both AND gates $334_{29}$ and $334_0$ when in single precision mode. Note that the second inputs for AND gates $334_{24}$ to $334_{28}$ corresponding to ROUND24, ROUND25, ROUND26, ROUND27 and ROUND28 are connected to "0". The output of each AND gate $334_0$ to $334_{52}$ is also coupled to a corresponding output ROUND0 to ROUND52 in a wired OR configuration. Since only one of the AND gates 331 and 334 is active at any time, a wired OR is feasible here. The circuit of FIG. 24 otherwise operates the same as that of FIG. 23.

Note that AND gates $331_0$ to $331_{52}$ and AND gates $334_0$ to $334_{52}$ are supplied opposite mode signals because of invertor 332. This means that either AND gates $331_0$ to $331_{52}$ are active and AND gates $334_0$ to $334_{52}$ are turned off or that AND gates $331_0$ to $331_{52}$ are turned off and AND gates $334_0$ to $334_{52}$ are active. Thus single precision/double precision align unit 330 outputs either the whole of the double precision input signals DP0 to DP52 unchanged or the single precision input signals SP0 to SP23 left and right justified according to this invention.

Double precision rounder 340 forms the rounded number in either single precision mode or double precision mode. Double precision rounder 340 is constructed in accordance with the known art. Note that the most significant bits of a single precision number are in the same location as the most significant bits of a double precision number. Likewise, the least significant bits of a single precision number are in the same location as the least significant bits of a double precision number. This alignment permits the same hardware to be used for both single precision and double precision rounding.

Mask unit 350 completes the process. In single precision mode, mask unit 350 passes bits 29 to 52 unchanged. The least significant bits 0 to 28 are set to "0" in single precision mode. This masks off the unused least significant bits in single precision mode. In double precision mode all 53 bits are passed unchanged. Those skilled in the art would realize that a circuit similar to that illustrated in FIG. 23 can perform this function. The output forms the bus Man_Out(52,0).

The status logic 309 of the normalize stage takes all the status information generated by all the blocks in the pipeline stages and generates the output status information required by the IEEE standard 754. Input status is generated by the unpackers. Floating point status register FPST 118 has four status flags defined for the floating point adder 210 unit. These were explained above in conjunction with the description of the floating point status register FPST 118.

The floating point multiplier 220 unit is a 32 bit single precision floating point multiplier with a microcode sequencer to allow it to perform double precision multiplies, and also single and double precision versions of divides and square roots. The floating point multiplier 220 unit handles numbers with normalized mantissas directly, but needs the assistance of the floating point adder 210 unit to handle denormalized numbers. As such, denormalized inputs or outputs impose an execution time penalty.

Since the floating point multiplier 220 has a number of longer instructions, the floating point multiplier 220 unit frequently can not start a new instruction on every cycle. However, these instruction can start on every clock assuming there are no input exceptions: floating point multiply with (1) two signed integer operands and a signed integer output, (2) two unsigned integer operands and an unsigned integer output, and (3) two single precision operands and a single precision output; vector multiply accumulate with two single precision operands and (1) a single precision output, or (2) a double precision output; a vector multiply subtract with two single precision operands and (1) a single precision output, or (2) a double precision output; and vector multiply with single precision operands and a single precision output.

The floating point multiplier 220 unit has the following stages after the execution unit's unpack stage: perform 32 bit integer or single precision floating point multiplication; and normalize and round output value.

Single precision floating point multiplication is performed by adding the two exponents to get the output exponent, and multiplying the two mantissas. At this point, the correct exponent and a nearly normalized mantissa are available. The input mantissas' range are from 1 to 2, so the resulting product's range is from 1 to <4. Thus the floating point multiplier 220 normalization stage is only a one bit shift, as compared to the multi-bit shift in the floating point adder 210 unit.

The next stage of the floating point multiplier 220 unit is devoted to normalizing the mantissa and rounding. During the normalize and rounding stage the mantissa may be greater than 2. If it is, the mantissa is shifted right by one bit and the exponent is incremented. The rounding stage is similar to the floating point adder 210 unit but requires two extra bits of precision: the 1st bit and the 2nd bit. During any multiply the results have more bits than the inputs. A single precision floating point multiply is 24 by 24 resulting in 48 bits. The lower 23 bits are logical ORed together to form the 2nd bit. The upper 25 bits plus the 2nd bit are kept as the mantissa. The rounding follows the same rules as the floating point adder 210 unit. The normalize stage also does the output status generation. Floating point multiplier 220 sets floating point status register FPST 118 status bits as explained above.

The single precision floating point multiplier 220 unit has a 32 by 32 array for use in integer by integer calculations, which makes a double precision multiply an iterative process. To generate a double precision result the double precision inputs are divided into upper and lower halves. Then multiplies are performed and summed as: result =(upper1×upper2)+(upper1×lower2)+(lower1×upper2)+(lower1×lower2). The four multiplies are needed even though the lower half of the results are discarded after rounding. The exponent path and the normalize stage of the floating point multiplier 220 unit are full double precision widths, so no iterations are needed through these sections.

FIG. 25 illustrates use of multiprocessor integrated circuit 100 of this invention in a high definition television system. FIG. 25 illustrates three sources of high definition television signals. These are broadcast television signals, compact disk read only memory signals and cable television signals.

Antenna 801 receives broadcast radio frequency signals including high definition television signals. Television tuner 802 includes a tuned receiver which selects a particular radio frequency signal, a demodulator that extracts image data encoded on the radio frequency signal and an analog to digital converter. Television tuner 802 thus generates digital signals corresponding to the high definition television images. These digital signals are temporarily stored in buffer 803, which is also connected to the image system bus.

Compact disk read only memory (CD ROM) player 811 reads data permanently stored on compact disks. These include image data corresponding to the desired high definition television program. Compact disk read only memory player 811 supplies digital data read from the compact disk to buffer 812 for temporary storage. Buffer 812 is also connected to the image system bus.

Cable system box 821 is bidirectionally connect to a cable system. This bidirectional connection permits transmission of high definition television signals to the user from the cable system and transmission of requests, queries and the like from the user to the cable system. The cable system may employ digital transmission to the user or may include radio frequency transmission similar to the radio frequency broadcasts mentioned above. Cable system box 821 includes any needed conversion circuits to supply digital image data to buffer 822 for temporary storage. Note that buffer 822 is also connected to the image system bus.

High definition television will very likely be transmitted in a data compressed format regardless of the mode of transmission. Multiprocessor integrated circuit 100 is programmed to receive the compressed data, decompress this data into individual television frames and supply the frame data to video random access memory 6. As previously described above, this data is recalled from video random access memory 6 and supplied to video palette 7. Video palette 7 generates the proper video signals to drive video display 8. This process of decompressing the image data as supplying it for display includes a lot of data movement both within multiprocessor integrated circuit 100 and along the image system bus. Transfer controller 80 response to requests for packet transfers from master processor 60 and digital image/graphics processors 71, 72, 73 and 74 to control this data movement and coordinate this data movement with other image system bus use such as memory refresh.

FIG. 26 illustrates another system embodiment of this invention. In FIG. 26 multiprocessor integrated circuit 101 includes master processor 60 and a single digital image/graphics processor 71. Multiprocessor integrated circuit 101 requires less silicon substrate area than multiprocessor integrated circuit 100 and consequently can be constructed less expensively. Multiprocessor integrated circuit 101 is constructed using the same techniques as previously noted for construction of multiprocessor integrated circuit 100. Because the width of each digital image/graphics processor matches the width of its corresponding memory and the associated portions of crossbar 50, multiprocessor integrated circuit 100 may be cut between digital image/graphics processors 71 and 72 to obtain the design of multiprocessor integrated circuit 101. Multiprocessor integrated circuit 101 can be employed for applications when the processing capacity of four digital image/graphics processors is not required.

Multiprocessor integrated circuit 101 is illustrated in FIG. 26 as part of a color facsimile apparatus. Modem 1301 is bidirectionally coupled to a telephone line for sending and receiving. Modem 1301 also communicates with buffer 1302, which is further coupled the image system bus. Modem 1301 receives a facsimile signal via the telephone line. Modem 1301 demodulates these signals, which are then temporarily stored in buffer 1302. Transfer controller 80 services buffer 1302 by transferring data to data memories 22, 23 and 24 for processing by digital image/graphics processor 71. In the event that digital image/graphics processor 71 cannot keep ahead of the incoming data, transfer controller 80 may also transfer data from buffer 1302 to memory 9. Digital image/graphics processor 71 processes the image data of the incoming facsimile. This may include image decompression, noise reduction, error correction, color base correction and the like. Once processed, transfer controller 80 transfers image data from data memories 22, 23 and 24 to video random access memory (VRAM) 1303. Printer controller 1304 recalls the image data under control of frame controller 90 and supplies it to color printer 1305, which forms the hard copy.

The apparatus of FIG. 26 can also send a color facsimile. Imaging device 3 scans the source document. Imaging device 3 supplies the raw image data to image capture controller 4 that operates under control of frame controller 90. This image data is stored in video random access memory 1303. Note that the embodiment illustrated in FIG. 26 shares video random access memory 1303 for both image capture and image display in contrast to the embodiment of FIG. 1, which uses separate video random access memories. Transfer controller 80 transfers this image data to data memories 22, 23 and 24. Digital image/graphics processor 71 then processes the image data for image compression, error correction redundancy, color base correction and the like. The processed data is transferred to buffer 1303 by transfer controller 80 as needed to support the facsimile transmission. Depending upon the relative data rates, transfer controller 80 may temporarily store data in memory 9 before transfer to buffer 1302. This image data in buffer 1302 is modulated by modem 1301 and transmitted via the telephone line.

Note that the presence of an imaging device and a color printer in the same system permits this system to also operate as a color copier. In this event data compression and decompression may not be required. However, digital image/graphics processor 71 is still useful for noise reduction and color base correction. It is also feasible for digital image/graphics processor 71 to be programmed to deliberately shift colors so that the copy has different coloring than the original. This technique, known as false coloring, is useful to conform the dynamic range of the data to the dynamic range of the available print colors.

We claim:

1. A magnitude comparator for first and second N bit data words comprising:

a set of N single bit comparators, each single bit comparator having an A input receiving one bit of the first N bit data word, a B input receiving a corresponding bit of the second N bit data word, each single bit comparator forming a signal on an A=B output having a first digital state if a signal received on said A input equals a signal received on said B input and supplying said signal received on said A input to an A>B output;

a set of N−1 two bit comparators disposed in at least one layer, each two bit comparator having an A[0]=B[0] input, an A[0]>B[0] input, an A[1]=B[1] input and an A[1]>B[1] input, each two bit comparator generating at an A=B output an AND of signals received at said A[0]=B[0] input and said A[1]=B[1] input and generating at an A>B output a signal equal to said signal received on said A[1]>B[1] input if said signal received at said A[0]=B[0] input has a first digital state and generating at said A>B output a signal equal to said signal received on said A[0]>B[0] input if said signal received at said A[0]=B[0] input has a second digital state opposite to said first digital state;

a first layer of said two bit comparators each having said A[0]=B[0] input connected to said A=B output of a first one of said single bit comparators, said A[0]>B[0] input connected to said A>B output of said first single bit comparator, said A[1]=B[1] input connected to said A=B output of a second single bit comparator corresponding to a next most significant bit than said first single bit comparator, said A[1]>B[1] input connected to said A>B output of said second single bit comparator;

subsequent layers of said two bit comparators each having said A[0]=B[0] input connected to said A=B output of a first two bit comparator of a prior layer, said A[0]>B[0] input connected to said A>B output of said first two bit comparator, said A[1]=B[1] input connected to said A=B output of a second comparator of a prior layer corresponding to a next most significant bit than said first two bit comparator, said A[1]>B[1] input connected to said A>B output of said second comparator;

a last layer of two bit comparators consisting of a single two bit comparator, said A=B output of said single two bit comparator of said last layer indicating whether said first N bit data word equals said second N bit data word and said A>B output of said single two bit comparator of said last layer indicating whether said first N bit data word is greater than said second N bit data word if said A=B output indicates inequality.

2. The magnitude comparator of claim 1, wherein:

each of said set of N single bit comparators includes
a two input exclusive NOR gate having a first input connected to said A input, a second input connected to said B input and an output connected to said A=B output,
a connection between said A input and said A>B output.

3. The magnitude comparator of claim 1, wherein:

each of said set of N single bit comparators includes performs the following functions:

$\{A=B\} = A \text{ XNOR } B$ $\{A>B\} = A$ where: A and B are said inputs to said single bit comparator; and $\{A=B\}$ and $\{A>B\}$ are the outputs from said single bit comparator.

4. The magnitude comparator of claim 1, wherein:

each of said set of N−1 two bit comparators includes
a two input AND gate having a first input connected to said A[1]=B[1] input, a second input connected to said A[0]=B[0] input and an output connected to said A=B output,
a first pass gate having an input connected to said A[1]>B[1] input, an output connected to said A>B output and a control input responsive to said A[1]=B[1] input, and
a second pass gate having an input connected to said A[0]>B[0] input, an output connected to said A>B output and a control input responsive to an inverse of said A[1]=B[1] input.

5. The magnitude comparator of claim 1, wherein:

each of said set of N−1 two bit comparators performs the following functions:

$\{A = B\} = \{A[1] = B[1]\} \text{ AND } \{A[0] = B[0]\}$ $\{A > B\} = (\text{NOT}\{A[1] = B[1]\} \text{ AND } \{A[1] > B[1]\}) \text{ OR } (\{A[1] = B[1]\} \text{ AND } \{A[0] > B[0]\})$ where: $\{A[0]>B[0]\}$, $\{A[0]=B[0]\}$, $\{A[1]>B[1]\}$ and $\{A[1]=B[1]\}$ are said inputs to said bit comparator; and $\{A=B\}$ and $\{A>B\}$ are said outputs from said bit comparator.

6. A method of comparing for first and second N bit data words comprising the steps of:

generating a first determination for each N bits of said first and second N bit data words by
    forming an A=B output indicating whether corresponding bits of said first and second N bit data words are equal, and
    forming an A>B output equal to said corresponding bit of said first N bit data input;

generating a second determination for each pair of bits of said first determination by
    forming an A=B output indicating whether said A=B outputs of two prior determinations are equal,
    forming an A>B output equal to a prior most significant A>B output if a prior most significant A=B output has a first digital state, and
    forming an A>B output equal to a prior least significant A>B output if said prior most significant A=B output has a second digital state opposite to said first digital state;

generating subsequent determinations for each pair of bits of prior determinations by
    forming an A=B output indicating whether said A=B outputs of two prior determinations are equal,
    forming an A>B output equal to a prior most significant A>B output if a prior most significant A=B output has a first digital state, and
    forming an A>B output equal to a prior least significant A>B output if said prior most significant A=B output has a second digital state opposite to said first digital state;

a last of said subsequent determinations
    forming an A=B output indicating whether said first N bit data word equals said second N bit data word, and
    forming an A>B output indicating whether said first N bit data word is greater than said second N bit data word if said A=B output indicates inequality.

7. The method of comparing of claim 6, wherein:

said step of generating a first determination for each N bits of said first and second N bit data words includes performing the following functions:

$$\{A=B\} = A \text{ XNOR } B$$

$$\{A>B\} = A$$

where: A and B are said corresponding bits of said first and second N bit data words, respectively; and $\{A=B\}$ and $\{A>B\}$ are said outputs of said first determinations.

8. The method of comparing of claim 6, wherein:

said step of generating said second and said subsequent determinations includes the following functions:

$$\{A=B\} = \{A[1]=B[1]\} \text{ AND } \{A[0]=B[0]\}$$

$$\{A>B\} = (\text{NOT}\{A[1]=B[1]\} \text{ AND } \{A[1]>B[1]\}) \text{ OR}$$

$$(\{A[1]=B[1]\} \text{ AND } \{A[0]>B[0]\})$$

where: $\{A[0]>B[0]\}$, $\{A[0]=B[0]\}$, $\{A[1]>B[1]\}$ and $\{A[1]=B[1]\}$ are said inputs to said determination; and $\{A=B\}$ and $\{A>B\}$ are said outputs from said determination.

* * * * *